US011232705B2

(12) United States Patent
Yang et al.

(10) Patent No.: US 11,232,705 B2
(45) Date of Patent: Jan. 25, 2022

(54) MITIGATION OF TRAFFIC OSCILLATION ON ROADWAY

(71) Applicant: Toyota Jidosha Kabushiki Kaisha, Toyota (JP)

(72) Inventors: Hao Yang, Mountain View, CA (US); Kentaro Oguchi, Menlo Park, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 333 days.

(21) Appl. No.: 16/202,095

(22) Filed: Nov. 28, 2018

(65) Prior Publication Data

US 2020/0168084 A1 May 28, 2020

(51) Int. Cl.
*G08G 1/08* (2006.01)
*G05D 1/00* (2006.01)
*G05D 1/02* (2020.01)
*B60W 30/18* (2012.01)
(Continued)

(52) U.S. Cl.
CPC .............. *G08G 1/08* (2013.01); *B60W 30/18* (2013.01); *G05D 1/0088* (2013.01); *G05D 1/0223* (2013.01); *G08G 1/0125* (2013.01); *G08G 1/052* (2013.01); *B60W 2554/00* (2020.02); *B60W 2720/106* (2013.01); *G05D 2201/0213* (2013.01)

(58) Field of Classification Search
CPC ......... G08G 1/08; G08G 1/052; B60W 30/18; B60W 2554/00; B60W 2720/106; G05D 1/0088; G05D 1/0223; G05D 2201/0213
USPC ......................................................... 701/23
See application file for complete search history.

(56) References Cited

U.S. PATENT DOCUMENTS

| 9,643,615 | B2 * | 5/2017 | Kline ..................... G08G 1/167 |
| 2017/0043768 | A1 * | 2/2017 | Prokhorov ........ B60W 30/0953 |
| 2017/0089717 | A1 * | 3/2017 | White ................ G01C 21/3492 |

(Continued)

FOREIGN PATENT DOCUMENTS

| CN | 106097735 A | * 11/2016 |
| CN | 106295560 A | * 1/2017 |

(Continued)

OTHER PUBLICATIONS

Chang-Hoon et al., "Lane Detection System with around View Monitoring for Intelligent Vehicle," 2013, Publisher: IEEE.*

(Continued)

*Primary Examiner* — Tuan C To
(74) *Attorney, Agent, or Firm* — VLP Law Group LLP; Michel Bohn

(57) ABSTRACT

In an example, a method determines a first controllable vehicle traveling along a mitigation road segment of a roadway and determines a control lane in the mitigation road segment. The control lane includes the first controllable vehicle and is impedible by the first controllable vehicle. The method determines a first open lane in the mitigation road segment and applies a target mitigation speed to the first controllable vehicle in the control lane. The first open lane is adjacent to the control lane in the mitigation road segment and the target mitigation speed is based on a traffic state of the first open lane. The target mitigation speed adjusts a traffic stream that flows through the first open lane to mitigate traffic congestion located downstream of the mitigation road segment.

31 Claims, 11 Drawing Sheets

(51) Int. Cl.
  G08G 1/01      (2006.01)
  G08G 1/052     (2006.01)

(56) References Cited

U.S. PATENT DOCUMENTS

| | | | |
|---|---|---|---|
| 2018/0037227 A1* | 2/2018 | D'sa | B60W 50/045 |
| 2019/0095722 A1* | 3/2019 | Kang | G06T 7/215 |
| 2019/0130182 A1* | 5/2019 | Zang | G06K 9/00651 |
| 2019/0329777 A1* | 10/2019 | Rajab | B60W 60/00276 |
| 2019/0329778 A1* | 10/2019 | D'sa | B62D 15/0255 |

FOREIGN PATENT DOCUMENTS

| | | | | |
|---|---|---|---|---|
| JP | 2017100534 A | * | 6/2017 | B60W 30/18163 |
| KR | 20180087968 A | * | 8/2018 | |

OTHER PUBLICATIONS

Juncheng et al., "Lane Segmentation in Traffic Monitoring Systems based on Probability Map," 2010, Publisher: IEEE.*

Yunxiang et al., "Prediction of Road Traffic Congestion Based on Random Forest," 2017, vol. 2; Publisher: IEEE.*

Arnott, "A Bathtub Model of Downtown Traffic Congestion," Access, Spring 2015, pp. 26-33, No. 46, retrieved from http://www.accessmagazine.org/spring-2015/a-bathtub-model-of-downtown-traffic-congestion/.

Barth et al., "Energy and emissions impacts of a freeway-based dynamic eco-driving system," Transportation Research Part D, 2009, pp. 400-410, No. 14, Elsevier Ltd.

Childress, "Notes on traffic flow," Mar. 29, 2005, pp. 1-28, retrieved from https://mafiadoc.com/notes-on-traffic-flow_5a31e0101723dd0c24d44fed.html.

data.gov, "Next Generation Simulation (NGSIM) Vehicle Trajectories and Supporting Data", Sep. 25, 2017, 3 pgs., retrieved from https://catalog.data.gov/dataset/next-generation-simulation-ngsim-vehicle-trajectories.

Immers et al., "Course H 111 Verkeerskunde Basis—Traffic Flow Theory," Faculty of Engineering Department of Civil Engineering Section Traffic and Infrastructure, May 2002, 39 pgs., Heverlee, Belgium.

Jin et al., "Studies on a Nonequilibrium Continuum Traffic Flow Model with Frozen 'Sound Wave' Speed," Transportation Research Record Journal of the Transportation Research Board, Nov. 15, 2002, 33 pgs., National Research Council (U.S.), Transportation Research Board, National Academy of Sciences.

Ketcheson et al., "Traffic flow: the Lighthill-Whitham-Richards model," The Riemann Problem for Hyperbolic PDEs: Theory and Approximate Solvers, Jul. 11, 2017, 8 pgs., retrieved from http://www.clawpack.org/riemann_book/html/Traffic_flow.html.

Learn et al., "A Freeway Speed Harmonization Experiment Using Connected and Automated Vehicles," IET Intelligent Transport Systems, 2017, pp. 319-326, vol. 12(5).

Massachusetts Institute of Technology, "Chapter 4: Fundamental Diagrams," at least as early as Sep. 5, 2018, 18 pgs., retrieved from https://ocw.tudelft.nl/wp-content/uploads/Chapter-4.-Fundamental-diagrams.pdf.

Mathew et al., "Chapter 31: Fundamental relations of traffic flow," Introduction to Transportation Engineering, NPTEL, May 3, 2007, p. 31.1-31.8.

Mathew et al., "Chapter 35: Capacity and Level of service," Introduction to Transportation Engineering, NPTEL, May 3, 2007, p. 35.1-35.6.

Ni, Traffic Flow Theory: Characteristics, Experimental Methods, and Numerical Techniques, Nov. 9, 2015, 415 pgs., Butterworth-Heinemann.

Piacentini et al., "Traffic control moving bottleneck of coordinated vehicles," HAL archives-ouvertes.fr, 2017, 7 pgs., retireved from https://hal.inria.fr/hal-01644823.

Rothery, "4. Car Following Models," Car Following Models, 2002, 44 pgs., Massachusetts Institute of Technology.

Wikibooks, "Fundamentals of Transportation/Shockwaves," Sep. 9, 2017, 6 pgs., retrieved from https://en.wikibooks.org/w/index.php?title=Fundamentals_of_Transportation/Shockwaves&oldid=3291110.

Yang et al., "A control theoretic formulation of green driving strategies based on inter-vehicle communications," Transportation Research Part C, 2014, pp. 48-60, No. 41, Elsevier Ltd.

Zheng et al., "Freeway Traffic Oscillations: Microscopic Analysis of Formations and Propagations using Wavelet Transform," Transportation Research Part C, 2011, pp. 1378-1388, No. 45(9), Elsevier Ltd.

"Chapter4: Fundamental Diagrams", Massachusetts Institute of Technology, https://ocw.tudelft.nl/wp-content/uploads/Chapter-4.-Fundamental-diagrams.pdf, Sep. 5, 2018, 18 pages.

"Next Generation Simulation (NGSIM) Vehicle Trajectories and Supporting Data", https://catalog.data.gov/dataset/next-generation-simulation-ngsim-vehicle-trajectories., Sep. 25, 2017, 3 pages.

Arnott , "A Bathtub Model of Downtown Traffic Congestion", Access, No. 46, retrieved from http://www.accessmagazine.org/spring-2015/a-bathtub-model-of-downtown-traffic-congestion/, Spring 2015, pp. 26-33.

Barth , et al., "Energy and emissions impacts of a freeway-based dynamic eco-driving system", Transportation Research Part D, No. 14, Elsevier Ltd., 2009, pp. 400-410.

Childress , "Notes on traffic flow", retrieved from https://mafiadoc.com/notes-on-trafficflow_5a31e0101723dd0c24d44fed html., Mar. 29, 2005, pp. 1-28.

Immers , et al., "Course H 111 Verkeerskunde Basis—Traffic Flow Theory", Faculty of Engineering Department of Civil Engineering Section Traffic and Infrastructure, Heverlee, Belgium, May 2002, 39 pgs.

Jin , et al., "Studies on a Nonequilibrium Continuum Traffic Flow Model with Frozen 'Sound Wave' Speed", Transportation Research Record Journal of the Transportation Research Board, National Research Council (U.S ), Transportation Research Board, National Academy of Sciences, Nov. 15, 2002, 33 pages.

Ketcheson , et al., "Traffic flow: the Lighthill-Whitham-Richards model", The Riemann Problem for Hyperbolic PDEs: Theory and Approximate Solvers, http://www.clawpack.org/riemann_book/html/Traffic_flow.html, Jul. 11, 2017, 8 pages.

Learn , et al., "A Freeway Speed Harmonization Experiment Using Connected and Automated Vehicles", IET Intelligent Transport Systems, vol. 12(5), 2017, pp. 319-326.

Mathew, et al., "Chapter 31: Fundamental relations of traffic flow", Introduction to Transportation Engineering, NPTEL.1-31.8., May 3, 2007, p. 31.

Mathew, et al., "Chapter 35: Capacity and Level of service", Introduction to Transportation Engineering, NPTEL, 1-35.6., May 3, 2007, p. 35.

Ni, DAIHENG , "Traffic Flow Theory: Characteristics, Experimental Methods, and Numerical Techniques", Butterworth-Heinemann, Nov. 9, 2015, 415 pages.

Piacentini, et al., "Traffic control moving bottleneck of coordinated vehicles", HAL archives-ouvertes.fr, https://hal.nria.fr/hal-01644823, 2017, 7 pages.

Rothery , "4. Car Following Models", Car Following Models, Massachusetts Institute of Technology, 2002, 44 pages.

Unknown , "Lee 11, Ch 6, pp. 173-187: Principles of traffic flow (objectives)", https://slideplayer.com/slide/5151624/, Jan. 2015, 9 pages.

Wikibooks , "Fundamentals of Transportation/Shockwaves", https://en.wikibooks.org/w/index.php?title=Fundamentals_of_Transportation/Shockwaves&oldid-3291110., Sep. 9, 2017, 6 pages.

Yang , et al., "A control theoretic formulation of green driving strategies based on inter-vehicle communications", Transportation Research Part C, No. 41, Elsevier Ltd, 2014, pp. 48-60.

Zheng , et al., "Freeway Traffic Oscillations: Microscopic Analysis of Formations and Propagations using Wavelet Transform", Transportation Research Part C, No. 45(9), Elsevier Ltd, 2011, pp. 1378-1388.

* cited by examiner

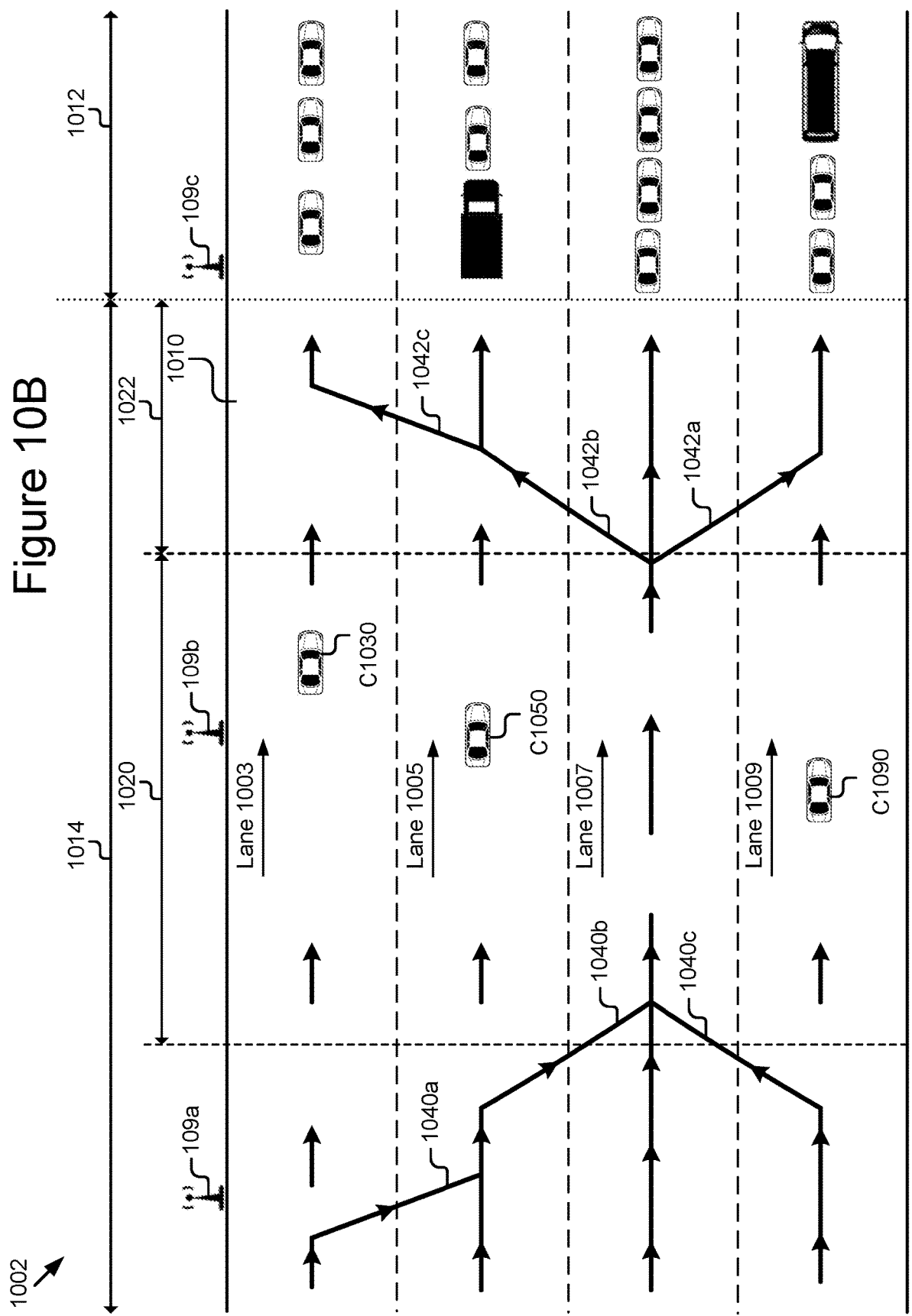

MITIGATION OF TRAFFIC OSCILLATION ON ROADWAY

BACKGROUND

The present disclosure relates to mitigating traffic oscillations on roadways, and in a more particular example, mitigating traffic oscillations on roadways using controllable vehicles.

Traffic oscillation is a stop-and-go driving condition in which the vehicles frequently accelerate and decelerate. The acceleration and deceleration of multiple vehicles due to traffic oscillations often result in excessive fuel consumption and generate a massive amount of vehicular emissions. Today, some modern systems rely on autonomous and remotely navigable vehicles to manipulate the traffic flow on the roadway to mitigate the traffic oscillation. These existing systems generally require the vehicles to collaboratively block all lanes of the roadway to prevent other vehicles from passing these controllable vehicles to proceed forward, thereby smoothing the traffic oscillation. However, in many situations, the vehicles cannot block all lanes of the roadway. Therefore, other vehicles may perform one or more lane change maneuvers to shift to one or more lanes unblocked by the blocking vehicles, and then pass these vehicles through the unblocked lanes to proceed forward. Thus, this approach is usually inefficient or even inapplicable to mitigate the traffic oscillation in these situations. In addition, the existing solutions often require a significant number of remotely navigable vehicles to be present on the roadway to operate. Therefore, it is usually impractical or impossible for these existing solutions to mitigate the traffic oscillations in multiple traffic contexts that include insufficient number of navigable vehicles.

SUMMARY

The subject matter described in this disclosure overcomes the deficiencies and limitations of the existing solutions by providing novel technology for mitigating the traffic congestion and smoothing the traffic oscillation on the roadway.

According to one innovative aspect of the subject matter described in this disclosure, a computer-implemented method comprises: determining a first controllable vehicle traveling along a mitigation road segment of a roadway; determining a control lane in the mitigation road segment, the control lane including the first controllable vehicle and being impedible by the first controllable vehicle; determining a first open lane in the mitigation road segment, the first open lane being adjacent to the control lane in the mitigation road segment; and applying a target mitigation speed to the first controllable vehicle in the control lane, the target mitigation speed being based on a traffic state of the first open lane, the target mitigation speed adjusting a traffic stream that flows through the first open lane to mitigate traffic congestion located downstream of the mitigation road segment.

In general, another innovative aspect of the subject matter described in this disclosure may be embodied in computer-implemented methods comprising: determining a first controllable vehicle and a second controllable vehicle traveling along a mitigation road segment of a roadway; monitoring a distance between the first controllable vehicle and the second controllable vehicle; determining that the distance between the first controllable vehicle and the second controllable vehicle satisfies a proximity distance threshold at a current timestamp; responsive to determining that the distance between the first controllable vehicle and the second controllable vehicle satisfies the proximity distance threshold at the current timestamp, determining a control lane and an impedible lane in the mitigation road segment, the control lane including the first controllable vehicle and being impedible by the first controllable vehicle, the impedible lane including the second controllable vehicle and being impedible by the second controllable vehicle; determining an open lane in the mitigation road segment, the open lane being adjacent to the control lane in the mitigation road segment; and applying a target mitigation speed to the first controllable vehicle in the control lane and the second controllable vehicle in the impedible lane, the target mitigation speed being based on a traffic state of the open lane, the target mitigation speed adjusting a traffic stream that flows through the open lane to mitigate traffic congestion located downstream of the mitigation road segment.

In general, another innovative aspect of the subject matter described in this disclosure may be embodied in systems comprising: one or more processors; one or more memories storing instructions that, when executed by the one or more processors, cause the system to: determine a first controllable vehicle traveling along a mitigation road segment of a roadway; determine a control lane in the mitigation road segment, the control lane including the first controllable vehicle and being impedible by the first controllable vehicle; determine a first open lane in the mitigation road segment, the first open lane being adjacent to the control lane in the mitigation road segment; and apply a target mitigation speed to the first controllable vehicle in the control lane, the target mitigation speed being based on a traffic state of the first open lane, the target mitigation speed adjusting a traffic stream that flows through the first open lane to mitigate traffic congestion located downstream of the mitigation road segment.

These and other implementations may each optionally include one or more of the following features: that the target mitigation speed increases a passing flow rate at which the traffic stream flowing through the first open lane passes the first controllable vehicle travelling at the target mitigation speed in the control lane; that determining a second open lane in the mitigation road segment, and wherein the target mitigation speed maximizes an overall passing flow rate at which the traffic stream flowing through the first open lane and a traffic stream flowing through the second open lane pass the first controllable vehicle travelling at the target mitigation speed in the control lane; that determining the first open lane in the mitigation road segment includes determining one or more proximate controllable vehicles located proximate to the first controllable vehicle in the mitigation road segment, and determining the first open lane in the mitigation road segment, the first open lane excluding the one or more proximate controllable vehicles and being unimpedible by the one or more proximate controllable vehicles; that determining a proximate controllable vehicle located proximate to the first controllable vehicle in the mitigation road segment, determining an impedible lane in the mitigation road segment, the impedible lane including the proximate controllable vehicle and being impedible by the proximate controllable vehicle, and applying the target mitigation speed to the proximate controllable vehicle in the impedible lane; that determining one or more open lanes and one or more impedible lanes in the mitigation road segment, the one or more open lanes including the first open lane, generating a first traffic diagram associated with the roadway in an unimpeded traffic condition, the control lane and the one or more impedible lanes in the mitigation road segment being unimpeded in the unimpeded traffic condition, generating a second traffic diagram associated with the one or more open lanes in an impeded traffic condition, the control lane and the one or more impedible lanes in the mitigation road segment being impeded in the impeded traffic condition, determining a target traffic state for an upstream portion of the mitigation road segment, the upstream portion of the mitigation road segment being located upstream of the first controllable vehicle, and determining the target mitigation speed for the first controllable vehicle based on the first traffic diagram associated with the roadway in the unimpeded traffic condition, the second traffic diagram associated with the one or more open lanes in the impeded traffic condition, and the target traffic state for the upstream portion of the mitigation road segment; that generating the first traffic diagram associated with the roadway in the unimpeded traffic condition includes monitoring traffic data of the roadway, computing one or more traffic metrics associated with the roadway based on the traffic data of the roadway, determining one or more roadway properties of the roadway, generating the first traffic diagram associated with the roadway in the unimpeded traffic condition based on an initial traffic diagram, the one or more traffic metrics associated with the roadway, and the one or more roadway properties of the roadway, and wherein the first traffic diagram indicates a relationship between a flow rate and a vehicle density on the roadway or a relationship between a vehicle speed and the vehicle density on the roadway in the unimpeded traffic condition; that the traffic data of the roadway includes one or more of a flow rate, a vehicle density, and a vehicle speed associated with a plurality of road segments of the roadway at a plurality of timestamps, the one or more traffic metrics associated with the roadway includes one or more of a roadway capacity, a capacity vehicle density corresponding to the roadway capacity, and a jam vehicle density associated with the roadway, and the one or more roadway properties of the roadway includes one or more of a speed limit and a number of lanes associated with the roadway; that generating the second traffic diagram associated with the one or more open lanes in the impeded traffic condition includes monitoring traffic data of the roadway, computing one or more traffic metrics associated with the roadway based on the traffic data of the roadway, computing one or more traffic metrics associated with the one or more open lanes based on the traffic metrics associated with the roadway and a number of open lanes in the mitigation road segment, determining one or more roadway properties of the one or more open lanes, generating the second traffic diagram associated with the one or more open lanes in the impeded traffic condition based on an initial traffic diagram, the one or more traffic metrics associated with the one or more open lanes, and the one or more roadway properties of the one or more open lanes, and wherein the second traffic diagram indicates a relationship between a flow rate and a vehicle density in the one or more open lanes or a relationship between a vehicle speed and the vehicle density in the one or more open lanes in the impeded traffic condition; that determining the target traffic state for the upstream portion of the mitigation road segment includes determining a traffic wave on the roadway and one or more propagation parameters of the traffic wave, determining a vehicle density of the mitigation road segment at a current timestamp, estimating an average vehicle density of the mitigation road segment at a future timestamp based on the vehicle density of the mitigation road segment at the current timestamp and the one or more propagation parameters of the traffic wave, and determining the target traffic state for the upstream portion of the mitigation road segment based on the average vehicle density of the mitigation road segment at the future timestamp; that determining the traffic wave on the roadway and the one or more propagation parameters of the traffic wave includes receiving vehicle movement data of one or more vehicles located on the roadway at a plurality of timestamps, determining a plurality of vehicle density distributions associated with the roadway at the plurality of timestamps based on the vehicle movement data of the one or more vehicles located on the roadway at the plurality of timestamps and the first traffic diagram associated with the roadway in the unimpeded traffic condition, and determining the traffic wave on the roadway and the one or more propagation parameters of the traffic wave based on the plurality of vehicle density distributions associated with the roadway at the plurality of timestamps; that the vehicle movement data of the one or more vehicles located on the roadway at the plurality of timestamps includes one or more of a vehicle location, a vehicle speed, and a vehicle lane of a vehicle among the one or more vehicles at a corresponding timestamp among the plurality of timestamps, and the one or more propagation parameters of the traffic wave includes one or more of a propagation speed, a propagation distance, a coverage area of a traffic stop region associated with the traffic wave, and a coverage area of a traffic moving region associated with the traffic wave; that determining the vehicle density of the mitigation road segment at the current timestamp includes receiving vehicle movement data of a vehicle, the vehicle movement data including a vehicle speed of the vehicle at a vehicle location in the mitigation road segment at the current timestamp, and determining the vehicle density of the mitigation road segment at the current timestamp based on the vehicle speed of the vehicle at the current timestamp and the first traffic diagram associated with the roadway in the unimpeded traffic condition; that determining the target traffic state for the upstream portion of the mitigation road segment includes determining the target traffic state on the first traffic diagram associated with the roadway in the unimpeded traffic condition based on an average vehicle density of the mitigation road segment at a future timestamp, and wherein the target mitigation speed transitions the upstream portion of the mitigation road segment to the target traffic state having the average vehicle density of the mitigation road segment at the future timestamp; that determining the target mitigation speed for the first controllable vehicle includes determining a tangent line including the target traffic state on the first traffic diagram associated with the roadway in the unimpeded traffic condition and being tangent to the second traffic diagram associated with the one or more open lanes in the impeded traffic condition, determining an initiation traffic state of the one or more open lanes on the second traffic diagram associated with the one or more open lanes in the impeded traffic condition based on the tangent line, the traffic state of the first open lane being the initiation traffic state of the one or more open lanes, and determining the target mitigation speed for the first controllable vehicle based on a slope of a state transition line, the state transition line including the initiation traffic state on the second traffic diagram associated with the one or more open lanes in the impeded traffic condition and the target traffic state on the first traffic diagram associated with the roadway in the unimpeded traffic condition.

These and other implementations may each optionally include one or more of the following features: that determining the first controllable vehicle that has a distance between the first controllable vehicle and the traffic congestion satisfying a congestion distance threshold, and determining the second controllable vehicle that has a distance between the second controllable vehicle and the first controllable vehicle satisfying an initial vehicle distance threshold.

Other implementations of one or more of these and other aspects include corresponding systems, apparatus, and computer programs, configured to perform the actions of methods, encoded on non-transitory computer storage devices.

The novel technology for mitigating traffic congestions and smoothing traffic oscillations on roadway in this disclosure is particularly advantageous in a number of respects. For example, the technology described herein is capable of efficiently addressing traffic congestion and mitigating traffic oscillations even if one or more vehicles may perform lane change maneuvers and/or passing behaviors in one or more lanes of the roadway. Thus, the present technology can flexibly resolve the traffic congestion and smooth the traffic oscillation on the roadway including multiple lanes in a variety of traffic contexts. As a further example, the present technology is capable of addressing traffic congestion and mitigating traffic oscillations with a single controllable vehicle travelling in one lane of the roadway. Therefore, the present technology is advantageously applicable even if the traffic flow on the roadway includes only a limited number of controllable vehicles. Furthermore, the technology described herein can adjust the vehicle movements of both controllable vehicles and other vehicles to resolve the traffic congestion and smooth the traffic oscillation. As the traffic congestion is addressed and the traffic oscillation is mitigated, the traffic flow of the entire roadway can be facilitated and the overall vehicle energy efficiency can be significantly improved.

It should be understood that the foregoing advantages are provided by way of example and that the technology may have numerous other advantages and benefits.

The disclosure is illustrated by way of example, and not by way of limitation in the figures of the accompanying drawings in which like reference numerals are used to refer to similar elements.

BRIEF DESCRIPTION OF THE DRAWINGS

FIG. 10B illustrates an example of adjusted traffic streams on the roadway to address traffic congestion and mitigate traffic oscillations.

DESCRIPTION

The technology described herein can mitigate traffic congestion and/or smooth traffic oscillations on the roadways. As described in further detail below, the technology includes various aspects, such as traffic mitigating methods, systems, computing devices, computer program products, and apparatuses, among other aspects.

An example traffic mitigating system can determine traffic congestion on a roadway, determine a first controllable vehicle travelling along a mitigation road segment of a roadway, and determine one or more proximate controllable vehicles located proximate to the first controllable vehicle. The traffic mitigating system can determine a control lane including the first controllable vehicle and being impedible by the first controllable vehicle, one or more impedible lanes including the one or more proximate controllable vehicles and being impedible by the one or more proximate controllable vehicles, and one or more open lanes being unimpedible in the mitigation road segment. The traffic mitigating system can determine a target mitigation speed for the first controllable vehicle, and apply the target mitigation speed to the first controllable vehicle in the control lane and/or the one or more proximate controllable vehicles in the one or more impedible lanes. As the first controllable vehicle may travel in the control lane and the one or more proximate controllable vehicles may travel in the one or more impedible lanes at the target mitigation speed, the traffic flow that passes the first controllable vehicle and/or the one or more proximate controllable vehicles through the one or more open lanes to reach the congested area can be adjusted, thereby mitigating traffic congestion and/or smoothing traffic oscillations.

Figure 1:
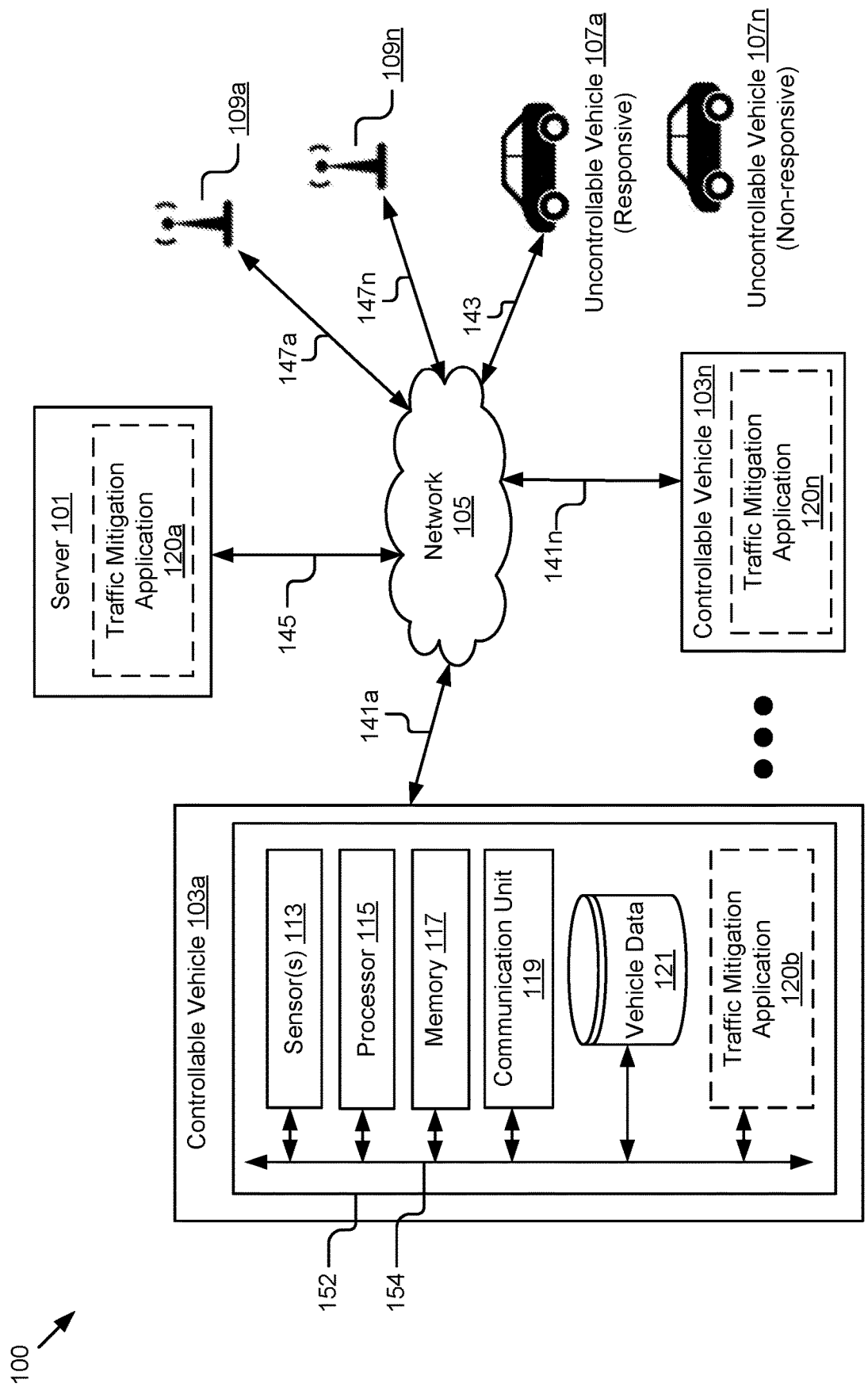
FIG. 1 is a block diagram of an example system for addressing traffic congestion and mitigating traffic oscillation on a roadway.

FIG. 1 is a block diagram of an example system 100 for addressing traffic congestion and/or mitigating traffic oscillations on roadways. As shown, the system 100 includes a server 101 and one or more traffic monitoring device 109a . . . 109n coupled for electronic communication via a network 105. The system 100 also includes one or more controllable vehicles 103a . . . 103n that are capable of being controlled to mitigate the traffic congestion. The controllable vehicles 103a . . . 103n are communicatively coupled to the other entities of the system 100.

A controllable vehicle 103 includes one or more computing devices 152 having sensor(s) 113, processor(s) 115, memory(ies) 117, communication unit(s) 119, a vehicle data store 121, and/or a traffic mitigation application 120. Examples of computing device(s) 152 may include virtual or physical computer processors, control units, micro-controllers, etc., which are coupled to other components of the controllable vehicle(s) 103, such as one or more sensors 113, one or more actuators, one or more motivators, etc.

A controllable vehicle 103 is a vehicle that is capable of controlling one or more aspects of the vehicle independent of a human driver of the vehicle. For example, the controllable vehicle can adjust dynamic aspects of the vehicle, such as the speed, acceleration, steering, braking, suspension, etc., of the vehicle independent of a human driver of the vehicle. For instance, a processor 115 of the controllable vehicle 103 may control various actuators and/or motivators (e.g., comprising the fuel system, engine, brake system, steering system, etc.) to regulate the movement and speed of the vehicle 103.

The controllable vehicle is responsive to instructions generated by an on-board processor and/or received via a computer network (e.g., via a wireless network). The controllable vehicle(s) 103 may be coupled to the network 105 via signal line 141, and may send and receive data via a network. For example, a controllable vehicle 103 may send and receive data to and from other controllable vehicle(s) 103, the traffic monitoring device(s) 109, the responsive vehicle(s) 107, and/or the server(s) 101. Non-limiting examples of the controllable vehicle(s) 103 include an automobile, a bus, a truck, a boat, a plane, a bionic implant, a robot, a drone, or any other suitable moving platforms capable of navigating from one point to another over land, water, air, space, etc.

The system 100 also includes one or more uncontrollable vehicles 107a . . . 107n that lack the capability of being controlled to mitigate the traffic congestion, or have the capability but are restricted from or incapable of using it when needed due to various reasons (e.g., system errors, power loss, opt-out settings, etc.). The uncontrollable vehicles 107a . . . 107n may include one or more responsive vehicles 107 communicatively coupled to the other entities of the system 100 (as reflected by the signal line 143) and one or more non-responsive vehicles 107 that are not communicatively coupled to the other entities of the system 100. The controllable vehicles 103a . . . 103n and the uncontrollable vehicles 107a . . . 107n may be referred to herein as vehicle(s) in some cases.

In FIG. 1 and the remaining figures, a letter after a reference number, e.g., "103a," represents a reference to the element having that particular reference number. A reference number in the text without a following letter, e.g., "103," represents a general reference to instances of the element bearing that reference number. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of controllable vehicles 103, uncontrollable vehicles 107, traffic monitoring devices 109, networks 105, or servers 101.

The network 105 may be a conventional type, wired and/or wireless, and may have numerous different configurations including a star configuration, token ring configuration, or other configurations. For example, the network 105 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), vehicular networks, and/or other interconnected data paths across which multiple devices may communicate.

The network 105 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 is a wireless network using a connection such as DSRC (Dedicated Short Range Communication), WAVE, 802.11p, a 3G, 4G, 5G+ network, WiFi™, satellite networks, vehicle-to-vehicle (V2V) networks, vehicle-to-infrastructure/infrastructure-to-vehicle (V2I/I2V) networks, or any other wireless networks. Although FIG. 1 illustrates a single block for the network 105 that couples to the server 101, the traffic monitoring device(s) 109, the controllable vehicle(s) 103, and the responsive vehicle(s) 107, it should be understood that the network 105 may in practice comprise any number of combination of networks, as noted above.

The server 101 includes a hardware and/or virtual server that includes a processor, a memory, and network communication capabilities (e.g., a communication unit). The server 101 may be communicatively coupled to the network 105, as reflected by signal line 145. In some embodiments, the server may send and receive data to and from other entities of the system 100, e.g., the controllable vehicle(s) 103, the responsive vehicle(s) 107, and/or the traffic monitoring device(s) 109. As depicted, the server 101 may include an instance 120a of a traffic mitigation application 120 as further discussed elsewhere herein.

The traffic monitoring device(s) 109a . . . 109n include a hardware and/or virtual device that includes a processor, a memory, and network communication capabilities (e.g., a communication unit). The traffic monitoring device(s) 109 may be communicatively coupled to the network 105, as reflected by signal line 147. In some embodiments, the traffic monitoring device(s) 109 may be the monitoring device(s) mounted at a high position and/or located on the roadside of various road segments of the roadway to monitor the traffic on the roadway and generate traffic data describing the traffic on the roadway. In some embodiments, the traffic data of the roadway may include the flow rate, the vehicle density, the vehicle speed, etc. associated with various road segments of the roadway at multiple timestamps. Other types of traffic data are also possible and contemplated.

In some embodiments, each traffic monitoring device 109 may monitor a corresponding road segment of the roadway, generate traffic data for the corresponding road segment, and send the traffic data associated with the corresponding road segment as the traffic data of the roadway to other entities of the system 100 (e.g., the controllable vehicle(s) 103, the server 101, etc.). In some embodiments, the traffic monitoring device 109 may include one or more image sensors (e.g., surveillance cameras) configured to capture images of the corresponding road segment within their sensor range, and one or more processing units configured to analyze the captured images to generate the traffic data associated with the corresponding road segment. As an example, the traffic monitoring device 109 may perform image processing on the captured images to determine the number of vehicles travelling on the corresponding road segment that pass the traffic monitoring device 109 in a predefined time period (e.g., 5 s), and compute the flow rate associated with the corresponding road segment accordingly. It should be understood that other implementations for monitoring the traffic on the roadway and generating the traffic data of the roadway are also possible and contemplated.

The processor(s) 115 may execute software instructions (e.g., tasks) by performing various input/output, logical, and/or mathematical operations. The processor(s) 115 may have various computing architectures to process data signals. The processor(s) 115 may be physical and/or virtual, and may include a single core or plurality of processing units and/or cores. In the context of the controllable vehicle 103, the processor may be an electronic control unit (ECU) implemented in the controllable vehicle 103 such as a car, although other types of platform are also possible and contemplated. The ECUs may receive and store the sensor data as vehicle operation data in the vehicle data store 121 for access and/or retrieval by the traffic mitigation application 120. In some implementations, the processor(s) 115 may be capable of generating and providing electronic display signals to input/output device(s), supporting the display of images, generating and transmitting vehicle movement data, performing complex tasks including various types of traffic condition analysis and optimal speed computation, etc. In some implementations, the processor(s) 115 may be coupled to the memory(ies) 117 via the bus 154 to access data and instructions therefrom and store data therein. The bus 154 may couple the processor(s) 115 to the other components of the controllable vehicle(s) 103 including, for example, the sensor(s) 113, the memory(ies) 117, the communication unit(s) 119, and/or and the vehicle data store 121.

The traffic mitigation application 120 includes software and/or hardware logic executable to resolve traffic congestion and mitigate traffic oscillation. As illustrated in FIG. 1, the server 101 and the controllable vehicle 103a . . . 103n may include instances 120a and 120b . . . 120n of the traffic mitigation application 120. In some embodiments, each instance 120a and 120b . . . 120n may comprise one or more components the traffic mitigation application 120 depicted in FIG. 2, and may be configured to fully or partially perform the functionalities described herein depending on where the instance resides. In some embodiments, the traffic mitigation application 120 may be implemented using software executable by one or more processors of one or more computer devices, using hardware, such as but not limited to a field-programmable gate array (FPGA), an application-specific integrated circuit (ASIC), etc., and/or a combination of hardware and software, etc. The traffic mitigation application 120 may receive and process the sensor data, the traffic data, the vehicle movement data, etc., and communicate with other elements of the controllable vehicle 103 via the bus 154, such as the memory 117, the communication unit 119, the vehicle data store 121, and various actuators and/or motivators, etc. For example, the traffic mitigation application 120 may communicate a target mitigation speed to one or more speed actuators of the controllable vehicle 103 to control the vehicle movement of the controllable vehicle 103, thereby mitigating traffic congestion and smoothing traffic oscillation on the roadway. The traffic mitigation application 120 is described in details below with reference to at least FIGS. 2-10B.

The memory(ies) 117 includes a non-transitory computer-usable (e.g., readable, writeable, etc.) medium, which can be any tangible non-transitory apparatus or device that can contain, store, communicate, propagate, or transport instructions, data, computer programs, software, code, routines, etc., for processing by or in connection with the processor(s) 115. For example, the memory(ies) 117 may store the traffic mitigation application 120. In some implementations, the memory(ies) 117 may include one or more of volatile memory and non-volatile memory. For example, the memory(ies) 117 may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory(ies) 117 may be a single device or may include multiple types of devices and configurations.

The communication unit 119 transmits data to and receives data from other computing devices to which it is communicatively coupled (e.g., via the network 105) using wireless and/or wired connections. The communication unit 119 may include one or more wired interfaces and/or wireless transceivers for sending and receiving data. The communication unit 119 may couple to the network 105 and communicate with other entities of the system 100, such as other controllable vehicle(s) 103, responsive vehicle(s) 107, traffic monitoring device(s) 109, and/or server(s) 101, etc. The communication unit 119 may exchange data with other computing nodes using standard communication methods, such as those discussed above.

The sensor(s) 113 includes any type of sensors suitable for the controllable vehicle(s) 103. The sensor(s) 113 may be configured to collect any type of signal data suitable to determine characteristics of the controllable vehicle 103 and/or its internal and external environments. Non-limiting examples of the sensor(s) 113 include various optical sensors (CCD, CMOS, 2D, 3D, light detection and ranging (LIDAR), cameras, etc.), audio sensors, motion detection sensors, barometers, altimeters, thermocouples, moisture sensors, infrared (IR) sensors, radar sensors, other photo sensors, gyroscopes, accelerometers, speedometers, steering sensors, braking sensors, switches, vehicle indicator sensors, windshield wiper sensors, geo-location sensors (e.g., GPS (Global Positioning System) sensors), orientation sensor, wireless transceivers (e.g., cellular, WiFi™, near-field, etc.), sonar sensors, ultrasonic sensors, touch sensors, proximity sensors, distance sensors, etc. In some embodiments, one or more sensors 113 may include externally facing sensors provided at the front side, rear side, right side, and/or left side of the controllable vehicle 103 to capture the situational context surrounding the controllable vehicle 103.

In some embodiments, the sensor(s) 113 may include one or more image sensors (e.g., optical sensors) configured to record images including video images and still images, may record frames of a video stream using any applicable frame rate, and may encode and/or process the video and still images captured using any applicable methods. In some embodiments, the image sensor(s) can capture images of surrounding environments within their sensor range. For example, in the context of a vehicle, the image sensors can capture the environment around the controllable vehicle 103 including roads, roadside structures, buildings, static road objects (e.g., lanes, road markings, traffic signs, traffic cones, barricades, etc.), and/or dynamic road objects (e.g., surrounding controllable vehicles 103 and uncontrollable vehicles 107, road workers, construction vehicles, etc.), etc. In some embodiments, the image sensors may be mounted on the vehicle roof and/or inside the controllable vehicle 103 to sense in any direction (forward, rearward, sideward, upward, downward facing, etc.) relative to the moving direction of the controllable vehicle 103. In some embodiments, the image sensors may be multidirectional (e.g., LIDAR).

The vehicle data store 121 includes a non-transitory storage medium that stores various types of data. For example, the vehicle data store 121 may store vehicle data being communicated between different components of a given controllable vehicle 103 using a bus, such as a controller area network (CAN) bus. In some embodiments, the vehicle data may include vehicle operation data collected from multiple sensors 113 coupled to different components of the controllable vehicle 103 for monitoring operating states of these components, e.g., transmission, vehicle speed, acceleration, deceleration, wheel speed (Revolutions Per Minute—RPM), steering angle, braking force, etc. In some embodiments, the vehicle data may include multiple road scene images captured by one or more image sensors of the controllable vehicle 103 and the image data associated with these images. In some embodiments, these captured images may be processed to determine lane information (e.g., vehicle lane in which the controllable vehicle 103 travels, etc.) and/or other information of the controllable vehicle 103.

In some embodiments, the vehicle data store 121 may store vehicle movement data describing the vehicle movement of the controllable vehicle 103 at multiple timestamps. For each timestamp, the vehicle movement data of the controllable vehicle 103 may include the vehicle speed, the vehicle location indicating the geographic location of the controllable vehicle 103 (e.g., GPS coordinates), the vehicle lane indicating the lane in which the controllable vehicle 103 travels, etc., at the corresponding timestamp. Other types of vehicle movement data are also possible and contemplated. In some embodiments, each controllable vehicle 103 may periodically transmit its vehicle movement data to other controllable vehicles 103 and the responsive vehicles 107 located within its communication range and/or to the server 101 (e.g., every 2 s). The controllable vehicle 103 may also receive the vehicle movement data describing the vehicle movement of other controllable vehicles 103 and the responsive vehicles 107 at multiple timestamps, and store the vehicle movement data of these vehicles in the vehicle data store 121.

In some embodiments, the vehicle data store 121 may store traffic data describing the traffic on various road segments of the roadway at multiple timestamps. For each road segment of the roadway at each timestamp, the traffic data of the roadway may include the vehicle density indicating the number of vehicles present on a predefined distance of the road segment at the corresponding timestamp (e.g., 40 vehicles/km), the flow rate indicating the number of vehicles passing a static point of observation on the road segment in a predefined time period at the corresponding timestamp (e.g., 4000 vehicles/h), the vehicle speed indicating the average speed of the vehicles travelling on the road segment at the corresponding timestamp (e.g., 100 km/h), etc. Other types of traffic data are also possible and contemplated.

In some embodiments, the vehicle data store 121 may also store traffic metrics indicating various properties of the traffic flow on the roadway. In some embodiments, the traffic metrics may include the roadway capacity (e.g., 5400 vehicles/hour), the capacity vehicle density (e.g., 60 vehicles/km), the jam vehicle density (e.g., 180 vehicles/km), etc., associated with the roadway. Other traffic metrics are also possible and contemplated.

In some embodiments, the vehicle data store 121 may store one or more traffic models, and one or more vehicle passing models corresponding to the one or more traffic models. In some embodiments, the traffic model may describe the traffic flow on the roadway and the traffic flow in one or more open lanes of the roadway. In some embodiments, the traffic flow on the roadway may include one or more traffic streams and each traffic stream may flow through one lane of the roadway. Similarly, the traffic flow in the one or more open lanes of the roadway may include one or more traffic streams and each traffic stream may flow through one open lane of the roadway. In some embodiments, the vehicle passing model corresponding to the traffic model may describe the traffic flow on the roadway and the traffic flow in the one or more open lanes of the roadway relative to a controllable vehicle 103 moving at a vehicle speed, and thus describing the passing flow that passes this controllable vehicle 103.

In some embodiments, the vehicle data store 121 may store the initial traffic condition diagram, the roadway properties of the roadway (e.g., speed limit, number of lanes, etc.), the roadway properties of the one or more open lanes of the roadway (e.g., number of open lanes, etc.), and/or other types of data for generating the traffic models and/or the vehicle passing models. In some embodiments, the vehicle data store 121 may also store the target mitigation speed for controlling the vehicle movement of one or more controllable vehicles 103 to mitigate traffic congestion and smooth traffic oscillations.

In some embodiments, the vehicle data store 121 may be part of a data storage system (e.g., a standard data or database management system) for storing and providing access to data. Other types of data stored in the vehicle data store 121 are also possible and contemplated.

Other variations and/or combinations are also possible and contemplated. It should be understood that the system 100 illustrated in FIG. 1 is representative of an example system and that a variety of different system environments and configurations are contemplated and are within the scope of the present disclosure. For instance, various acts and/or functionality may be moved from a server to a client, or vice versa, data may be consolidated into a single data store or further segmented into additional data stores, and some implementations may include additional or fewer computing devices, services, and/or networks, and may implement various functionality client or server-side. Further, various entities of the system may be integrated into a single computing device or system or divided into additional computing devices or systems, etc.

Figure 2:
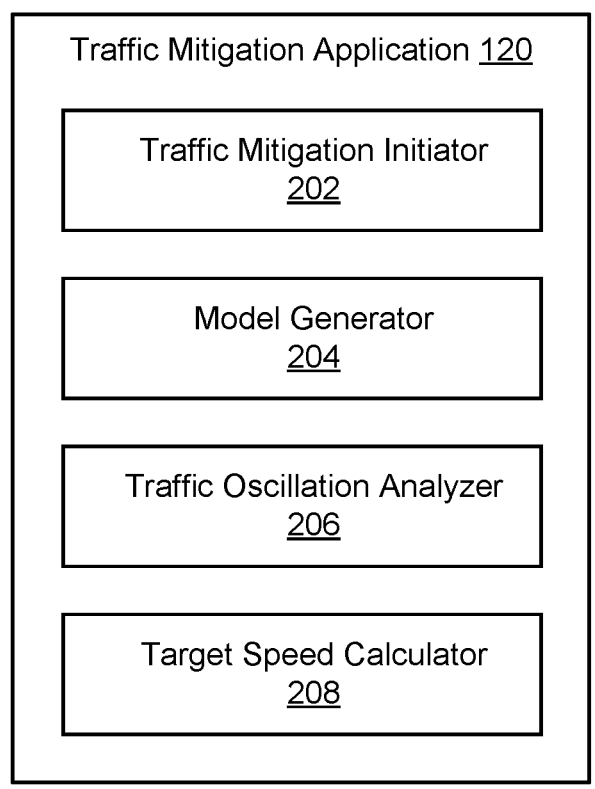
FIG. 2 is a block diagram of an example traffic mitigation application.

FIG. 2 is a block diagram of an example traffic mitigation application 120. As depicted, the traffic mitigation application 120 may include a traffic mitigation initiator 202, a model generator 204, a traffic oscillation analyzer 206, and a target speed calculator 208, although it should be understood that the traffic mitigation application 120 may include additional components such as, but not limited to, a configuration engine, a training engine, an encryption/decryption engine, etc., and/or these various components may be combined into a single engine or divided into additional engines.

The traffic mitigation initiator 202, the model generator 204, the traffic oscillation analyzer 206, and the target speed calculator 208 may be implemented as software, hardware, or a combination of the foregoing. In some embodiments, the traffic mitigation initiator 202, the model generator 204, the traffic oscillation analyzer 206, and the target speed calculator 208 may be communicatively coupled by the bus 154 and/or the processor 115 to one another and/or the other components of the computing device 152. In some embodiments, one or more of the components 120, 202, 204, 206, and/or 208 are sets of instructions executable by the processor 115 to provide their functionality. In further embodiments, one or more of the 120, 202, 204, 206, and/or 208 are storable in the memory 117 and are accessible and executable by the processor 115 to provide their functionality. In any of the foregoing embodiments, these components 120, 202, 204, 206, and/or 208 may be adapted for cooperation and communication with the processor 115 and other components of the computing device 152. The traffic mitigation application 120, and its components 202, 204, 206, and 208 are described in further detail below with reference to at least FIGS. 3-10B.

Figure 10A:
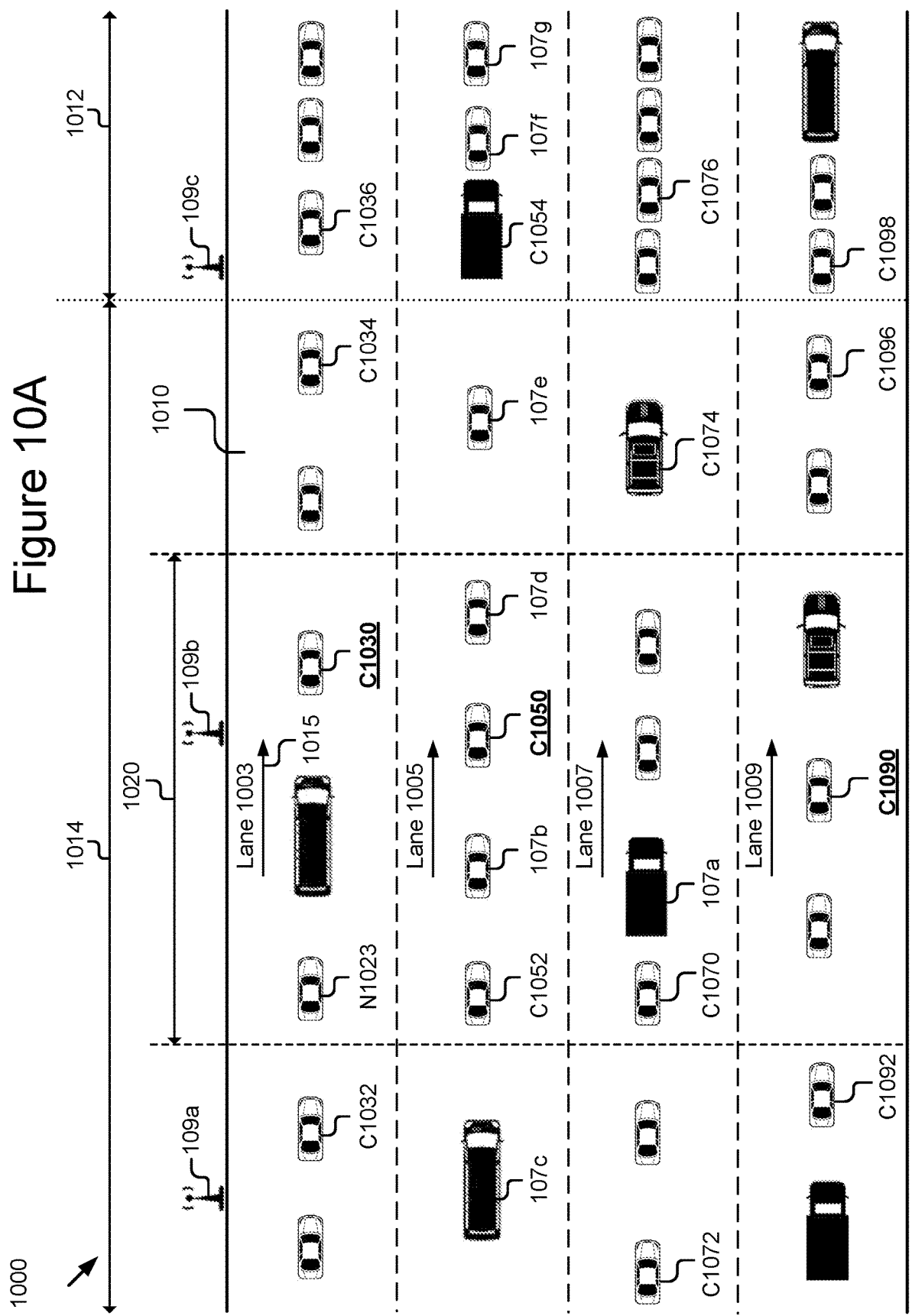
FIG. 10A illustrates an example traffic congestion situation on the roadway.

As discussed elsewhere herein, the traffic mitigation application 120 includes logic executable to determine target mitigation speed for one or more controllable vehicles 103 to resolve traffic congestion and smooth traffic oscillation on a roadway. As an example, a general traffic congestion situation 1000 is illustrated in FIG. 10A. As shown, FIG. 10A depicts a roadway 1010 including a congested area 1012 in which traffic congestion occurs and a traffic moving area 1014 in which the vehicles can still proceed. The traffic moving area 1014 may be located upstream of the congested area 1012 in the moving direction 1015 of the roadway 1010. As depicted, the roadway 1010 includes 4 lanes (e.g., lane 1003, lane 1005, lane 1007, lane 1009). Thus, the traffic flow on the roadway 1010 may include 4 traffic streams, each traffic stream may flow through one lane of the roadway 1010. The roadway 1010 may also be provided with multiple traffic monitoring devices 109 located along the roadway 1010. As discussed elsewhere herein, the traffic monitoring devices 109 may monitor the traffic and generate the traffic data describing the traffic on the roadway 1010 at multiple timestamps.

As illustrated in FIG. 10A, the vehicles may travel in each lane of the roadway 1010 in the moving direction 1015. In some embodiments, the vehicles travelling on the roadway 1010 may include one or more controllable vehicles 103 and one or more uncontrollable vehicles 107. The controllable vehicle 103 may have the capability and/or permission of its owner to communicate the vehicle movement data, the traffic data, etc., to and from other responsive entities (e.g., other controllable vehicles 103, the responsive vehicles 107, the traffic monitoring devices 109, the server 101, etc.), may receive or compute the target mitigation speed, and may adjust its vehicle speed to the target mitigation speed to mitigate traffic congestion and smooth traffic oscillations.

On the other hand, the uncontrollable vehicle 107 may be unable to or incapable of receiving or computing the target mitigation speed and adjusting its vehicle speed to the target mitigation speed to mitigate traffic congestion and smooth traffic oscillations. In this present disclosure, the controllable vehicles 103 may be indicated by reference numbers with prefix "C" (controllable). For example, as shown in FIG. 10A, the vehicles travelling in the lane 1005 of the roadway 1010 is a random mixture of the controllable vehicles C1052, C1050, C1054, and the uncontrollable vehicles 107b-107g. Among these uncontrollable vehicles 107, the uncontrollable vehicles 107c, 107d, 107g may be responsive vehicles 107 (that are restricted from being controlled or are unutilized/unneeded) while the uncontrollable vehicles 107b, 107e, 107f may be the non-responsive vehicles 107.

As a vehicle travels along the roadway 1010, the vehicle may perform one or more passing behaviors. For example, a vehicle travelling in one lane may pass one or more vehicles travelling in other lanes of the roadway 1010 due to its higher vehicle speed. The vehicle may also perform a passing maneuver to pass one or more vehicles travelling in its current lane. As an example, in the traffic context depicted in FIG. 10A, the controllable vehicle C1050 may travel in the lane 1005 at a lower vehicle speed as compared to other vehicles in other lanes. Thus, the uncontrollable vehicle 107a travelling in the lane 1007 may pass the controllable vehicle C1050 travelling in the lane 1005. In this example, the controllable vehicle C1052 in the lane 1005 may perform a passing maneuver to pass other vehicles travelling in front of it in the lane 1005. For example, when there is sufficient space in the lane 1007, the controllable vehicle C1052 may perform a lane change maneuver to shift from the lane 1005 to the lane 1007, pass the uncontrollable vehicle 107b and the controllable vehicle C1050 travelling in the lane 1005 as the controllable vehicle C1052 travels in the lane 1007, and then perform another lane change maneuver to shift from the lane 1007 back to the lane 1005. As a result of this passing maneuver, the controllable vehicle C1052 may pass from the vehicle location behind the uncontrollable vehicle 107b in the lane 1005 to the vehicle location in front of the controllable vehicle C1050 in the lane 1005. Alternatively, after passing the uncontrollable vehicle 107b and the controllable vehicle C1050, the controllable vehicle C1052 may continue travelling in the lane 1007 or perform another lane change maneuver to shift from the lane 1007 to a different lane of the roadway 1010 (e.g., the lane 1009). In this present disclosure, the passing behavior of the vehicle may refer to any passing maneuvers performed by the uncontrollable vehicle 107b and the controllable vehicle C1052 described in the above example. Other types of passing behavior are also possible and contemplated.

Figure 3:
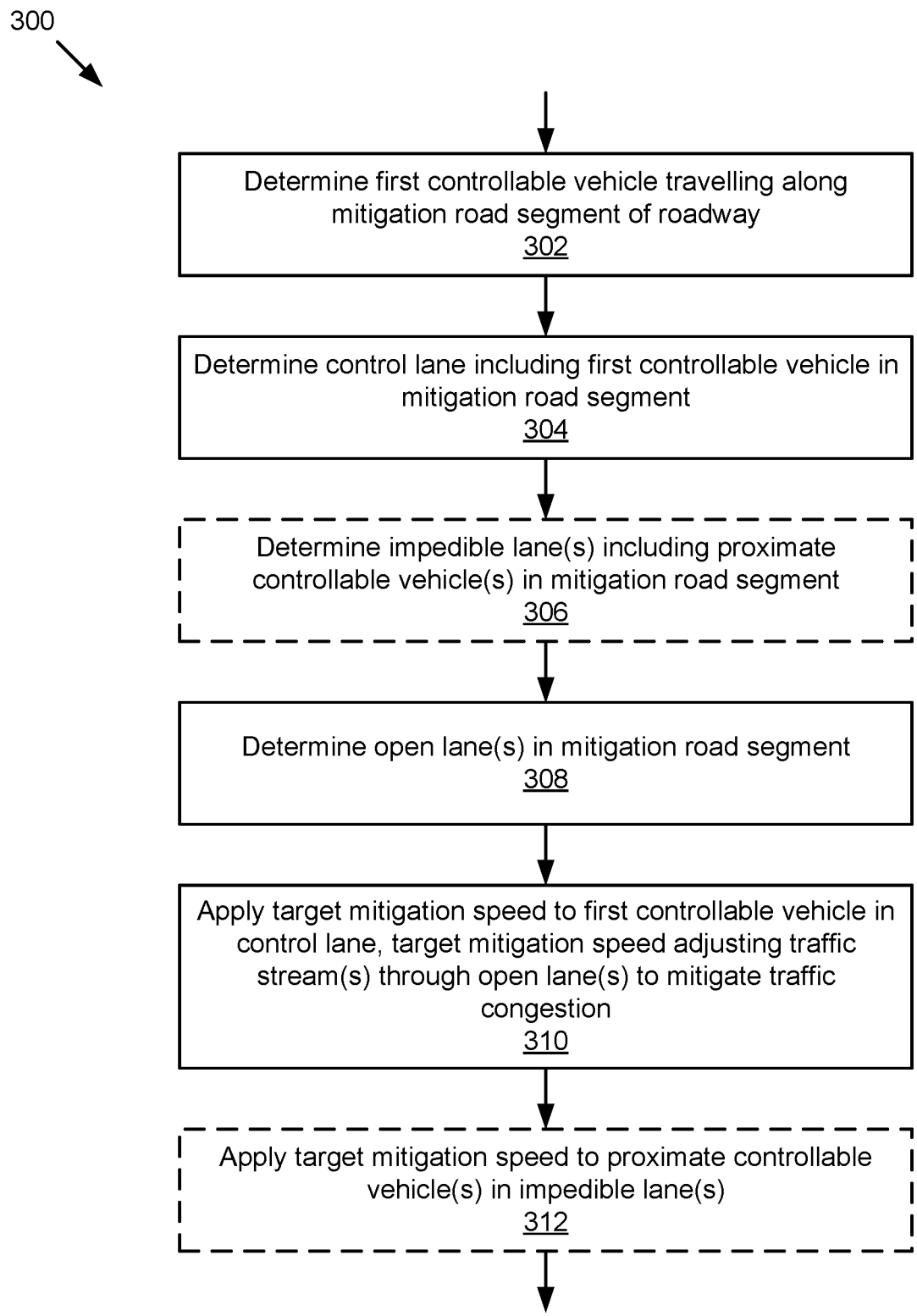
FIG. 3 is a flowchart of an example method for addressing traffic congestion and mitigating traffic oscillation.

FIG. 3 is a flowchart of an example method 300 for addressing traffic congestion and mitigating traffic oscillations. In block 302, the traffic mitigation initiator 202 may determine a first controllable vehicle 103 traveling along a mitigation road segment of a roadway. In some embodiments, to determine the first controllable vehicle 103 traveling along the mitigation road segment, the traffic mitigation initiator 202 may determine traffic congestion on the roadway. For example, the traffic mitigation initiator 202 may analyze the traffic data of the roadway, determine a congested area on the roadway that has the flow rate in the congested area satisfying the congested flow rate threshold (e.g., less than 20 vehicles/hour), and thus determine that traffic congestion is present in the congested area. In the example depicted in FIG. 10A, the traffic mitigation initiator 202 may determine that the congested area 1012 of the roadway 1010 is in fact congested. In some embodiments, the traffic mitigation initiator 202 may also determine the geographic location (e.g., GPS coordinates) of the congested area. The geographic location of the congested area may be referred to as the geographic location of the traffic congestion. In some embodiments, the traffic mitigation initiator 202 may receive information describing the traffic congestion from other entities (e.g., the server 101, the traffic monitoring device 109, etc.).

In some embodiments, the traffic mitigation initiator 202 may determine the first controllable vehicle 103 located upstream of the traffic congestion, the first controllable vehicle 103 may have the distance between the first controllable vehicle 103 and the traffic congestion satisfying a congestion distance threshold (e.g., more than 45 m). In some embodiments, the traffic mitigation initiator 202 may determine multiple controllable vehicles 103 located upstream of the traffic congestion that has the distance to the traffic congestion satisfying the congestion distance threshold, and randomly select the first controllable vehicle 103 among these multiple controllable vehicles 103. In some embodiments, the traffic mitigation initiator 202 may determine the controllable vehicle 103 that has the lowest distance to the traffic congestion among these multiple controllable vehicles 103, and determine this controllable vehicle 103 to be the first controllable vehicle 103. Other implementations for determining the first controllable vehicle 103 are also possible and contemplated.

In some embodiments, the traffic mitigation initiator 202 may determine the mitigation road segment associated with the first controllable vehicle 103. As discussed in detail below, the first controllable vehicle 103 may travel along the mitigation road segment and adjust the traffic streams flowing through one or more lanes of the mitigation road segment to mitigate the traffic congestion and smooth the traffic oscillation. In some embodiments, the traffic mitigation initiator 202 may determine the mitigation road segment located upstream of the traffic congestion, the mitigation road segment may have a predefined coverage area (e.g., 60 m) with the first controllable vehicle 103 located at a predefined position relative to the mitigation road segment (e.g., center point, 20 m from the start point of the mitigation road segment, etc.).

In some embodiments, the traffic mitigation initiator 202 may determine the mitigation road segment based on the traffic waves on the roadway. As discussed elsewhere herein, the traffic oscillation analyzer 206 may determine one or more traffic waves on the roadway and one or more oscillation cycles of the traffic waves. Each oscillation cycle of the traffic wave may include a traffic stop region in which the vehicles cannot move forward and a traffic moving region in which the vehicles can still move forward. In some embodiments, the traffic mitigation initiator 202 may determine the mitigation road segment that includes the first controllable vehicle 103 therein and has the coverage area of the mitigation road segment including one or more oscillation cycles of the traffic waves. Other implementations for determining the mitigation road segment associated with the first controllable vehicle 103 are also possible and contemplated.

Continuing the example in FIG. 10A, the traffic mitigation initiator 202 may determine the first controllable vehicle 103 to be the controllable vehicle C1050 travelling in the lane 1005 of the roadway 1010. In this example, the traffic mitigation initiator 202 may also determine the mitigation road segment to be the mitigation road segment 1020. As depicted in FIG. 10A, the mitigation road segment 1020 may be located upstream of the traffic congestion in the congested area 1012, and the first controllable vehicle C1050 may travel in the lane 1005 along the mitigation road segment 1020.

In block 304, the traffic mitigation initiator 202 may determine a control lane in the mitigation road segment, the control lane may include the first controllable vehicle 103 and may be impedible by the first controllable vehicle 103. For example, the first controllable vehicle 103 may be controlled to travel in the control lane at a vehicle speed lower than the vehicle speed of surrounding vehicles in other lanes, and thus impeding the traffic stream behind the first controllable vehicle 103 in the control lane as compared to the traffic streams flowing through the other lanes in the mitigation road segment. Continuing the example in FIG. 10A, the traffic mitigation initiator 202 may determine the control lane to be the lane 1005 including the first controllable vehicle C1050.

In block 306, the traffic mitigation initiator 202 may optionally determine one or more impedible lanes in the mitigation road segment, the impedible lanes may be distinct from the control lane. In some embodiments, to determine the impedible lane, the traffic mitigation initiator 202 may determine the proximate controllable vehicle(s) 103 located proximate to the first controllable vehicle 103 in the mitigation road segment, and determine the impedible lane including one or more proximate controllable vehicles 103.

Thus, similar to the control lane being impedible by the first controllable vehicle 103, the impedible lane may be impedible by the proximate controllable vehicle 103 included in the impedible lane.

In some embodiments, to determine the proximate controllable vehicle 103, the traffic mitigation initiator 202 may determine the controllable vehicle 103 that has the distance between the controllable vehicle 103 and the first controllable vehicle 103 in the control lane satisfying a proximate distance threshold (e.g., less than 5 m), and determine this controllable vehicle 103 to be the proximate controllable vehicle 103. As the proximate controllable vehicle 103 in the impedible lane is located proximate to the first controllable vehicle 103 in the control lane, the proximate controllable vehicle 103 may be controlled together with the first controllable vehicle 103 to collaboratively mitigate the traffic congestion. This implementation is particularly advantageous because it can reduce the amount of time needed to mitigate the traffic congestion due to the larger number of lanes in which the traffic streams are impeded. However, it should be understood that the traffic mitigation application 120 is capable of mitigating the traffic congestion even if only the first controllable vehicle 103 in the control lane is controlled to impede/regulate the traffic stream flowing through the control lane, while the proximate controllable vehicles 103 in the impedible lanes are not controlled and therefore the traffic streams flowing through these impedible lanes are not impeded.

Continuing the example in FIG. 10A, the traffic mitigation initiator 202 may determine that the distance along the moving direction 1015 of the roadway 1010 between the controllable vehicle C1030 and the first controllable vehicle C1050, and the distance along the moving direction 1015 between the controllable vehicle C1090 and the first controllable vehicle C1050 satisfy the proximate distance threshold (e.g., less than 5 m). Thus, the traffic mitigation initiator 202 may determine the controllable vehicle C1030 and the controllable vehicle C1090 to be the proximate controllable vehicles 103 located proximate to the first controllable vehicle C1050. As shown, the proximate controllable vehicle C1030 may be located downstream of the first controllable vehicle C1050 while the proximate controllable vehicle C1090 may be located upstream of the first controllable vehicle C1050. In this example, the traffic mitigation initiator 202 may determine the lane 1003 including the proximate controllable vehicle C1030 to be the first impedible lane and the lane 1009 including the proximate controllable vehicle C1090 to be the second impedible lane in the mitigation road segment 1020.

In block 308, the traffic mitigation initiator 202 may determine one or more open lanes in the mitigation road segment, the open lane may be distinct from the control lane and the impedible lanes. In some embodiments, the open lane may be directly adjacent or indirectly adjacent to the control lane (e.g., the open lane and the control lane may or may not have other lane(s) located therebetween). In some embodiments, the traffic mitigation initiator 202 may determine the proximate controllable vehicle(s) 103 located proximate to the first controllable vehicle 103 in the mitigation road segment as discussed above, and determine the open lane that excludes these proximate controllable vehicle(s) 103. As the open lane is distinct from the control lane and excludes the proximate controllable vehicles 103, the open lane may be unimpedible by the first controllable vehicle 103 and the proximate controllable vehicles 103, and thus the traffic stream flowing through the open lane cannot be impeded in the mitigation road segment. It should be understood that the mitigation road segment may include multiple open lanes and these open lanes may be directly or indirectly adjacent to one another (e.g., two open lanes may or may not have the control lane and/or the impedible lane(s) located therebetween).

Continuing the example in FIG. 10A, the traffic mitigation initiator 202 may determine that the lane 1007 does not include the first controllable vehicle C1050, or any of the proximate controllable vehicle C1030 and the proximate controllable vehicle C1090 located proximate to the first controllable vehicle C1050. Thus, the traffic mitigation initiator 202 may determine the lane 1007 to be the open lane in which the traffic stream flowing through the lane 1007 cannot be impeded. Thus, in this example, the traffic mitigation initiator 202 may determine that the mitigation road segment 1020 includes the control lane 1005, the impedible lane 1003, the impedible lane 1009, and the open lane 1007. The traffic mitigation initiator 202 may also determine that the traffic stream flowing through the control lane 1005 is impedible by the first controllable vehicle C1050, the traffic stream flowing through the impedible lane 1003 is impedible by the proximate controllable vehicle C1030, the traffic stream flowing through the impedible lane 1009 is impedible by the proximate controllable vehicle C1090, and the traffic stream flowing through the open lane 1007 is unimpedible.

In block 310, the traffic mitigation application 120 may apply a target mitigation speed to the first controllable vehicle 103 in the control lane. In block 312, if the mitigation road segment includes one or more impedible lanes, the traffic mitigation application 120 may also apply the target mitigation speed to one or more proximate controllable vehicles 103 in the one or more impedible lanes. As discussed in detail below, the target mitigation speed applied to the first controllable vehicle 103 and/or the proximate controllable vehicles 103 may adjust the traffic streams flowing through the one or more open lanes in the mitigation road segment, thereby mitigating the traffic congestion located downstream of the mitigation road segment. In some embodiments, the model generator 204, the traffic oscillation analyzer 206, and the target speed calculator 208 may determine the target mitigation speed for the first controllable vehicle 103 based on a traffic state of the one or more open lanes and other factors.

Figure 4:
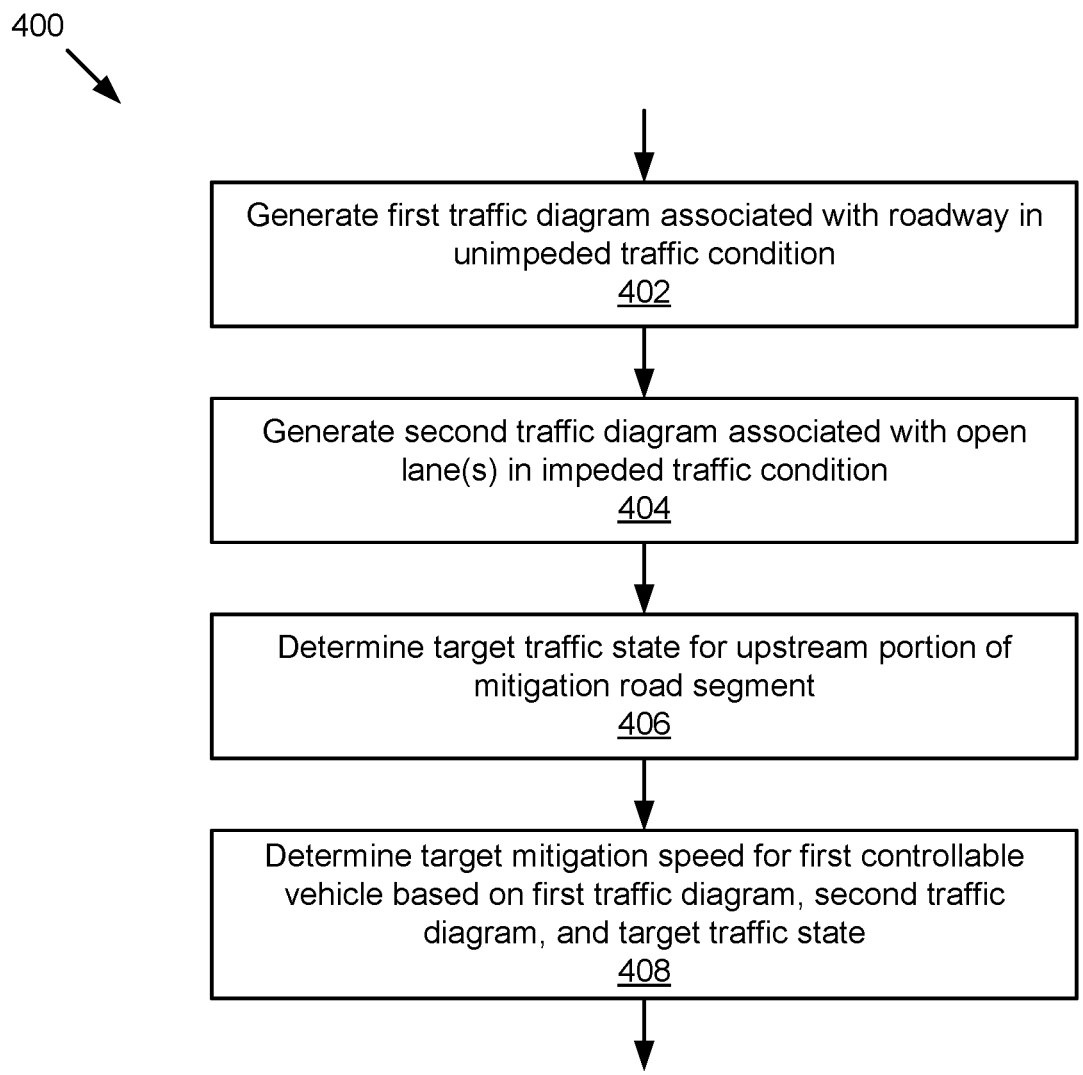
FIG. 4 is a flowchart of an example method for determining a target mitigation speed for a controllable vehicle.

FIG. 4 is a flowchart of an example method 400 for determining the target mitigation speed for the first controllable vehicle 103 in the control lane. It should be understood that the method 400 is applicable to determine the target mitigation speed for the first controllable vehicle 103 in various traffic contexts in which the mitigation road segment includes at least one open lane and any number of the impedible lanes. In some embodiments, the target mitigation speed applied to the first controllable vehicle 103 in the control lane may be lower than the vehicle speed of other vehicles travelling in the one or more open lanes of the mitigation road segment, and thus the first controllable vehicle 103 may impede the traffic stream flowing through the control lane as compared to the traffic streams flowing through the one or more open lanes. Similarly, as the target mitigation speed is applied to the proximate controllable vehicles 103 in the impedible lanes, the proximate controllable vehicles 103 may also impede the traffic streams flowing through the impedible lanes as compared to the traffic streams flowing through the one or more open lanes. As a result, the vehicles travelling behind the first controllable vehicle 103 in the control lane and behind the proximate controllable vehicles 103 in the impedible lanes may likely perform one or more lane change maneuvers when it is possible to shift to the one or more open lanes. As these vehicles travel shift to the one or more open lanes, these vehicles may pass the first controllable vehicle 103 travelling in the control lane and/or the proximate controllable vehicles 103 travelling in the impedible lanes and proceed with faster movement.

In some embodiments, if the mitigation road segment includes a single open lane, the target mitigation speed may increase or maximize the passing flow rate at which the traffic stream flowing through the only open lane passes the first controllable vehicle 103 and/or the proximate controllable vehicles 103 as the first controllable vehicle 103 and/or the proximate controllable vehicles 103 travel in their corresponding lane at the target mitigation speed. If the mitigation road segment includes multiple open lanes, the target mitigation speed may increase or maximize the overall passing flow rate at which the traffic flow flowing through these multiple open lanes passes the first controllable vehicle 103 and/or the proximate controllable vehicles 103 as the first controllable vehicle 103 and/or the proximate controllable vehicles 103 travel in their corresponding lane at the target mitigation speed. This implementation can advantageously mitigate the traffic congestion. For instance, to increase or maximize the overall passing flow rate, the first controllable vehicle 103 and/or the proximate controllable vehicles 103 may travel at a target mitigation speed that is sufficiently low, thereby sufficiently regulating the upstream traffic heading towards the traffic congestion. In addition, as the overall passing flow rate is increased or maximized, the first controllable vehicle 103 and/or the proximate controllable vehicles 103 travelling at the target mitigation speed may limit the upstream traffic heading towards the traffic congestion, while still allow a portion of this upstream traffic that can be accommodated by the road segment located downstream of the mitigation road segment to proceed forward through the one or more open lanes.

In block 402, the model generator 204 may generate a first traffic diagram associated with the roadway in an unimpeded traffic condition. In the unimpeded traffic condition, the first controllable vehicle 103 in the control lane and the proximate controllable vehicles 103 in the one or more impedible lanes may not be controlled with the target mitigation speed, and therefore the traffic stream flowing through the control lane and the traffic streams flowing through the impedible lanes may not be impeded in the mitigation road segment. Thus, the traffic streams flowing through all lanes of the roadway in the mitigation road segment (e.g., the control lane, the impedible lane(s), and the open lane(s)) may not be impeded in the unimpeded traffic condition.

In some embodiments, the first traffic diagram associated with the roadway in the unimpeded traffic condition may describe the traffic flow on the roadway (thus, also on the mitigation road segment of the roadway) as all lanes of the roadway are not impeded. In some embodiments, the first traffic diagram may indicate a relationship between the flow rate and the vehicle density on the roadway, and/or a relationship between the vehicle speed and the vehicle density on the roadway in the unimpeded traffic condition. As discussed elsewhere herein, the vehicle density on the roadway may indicate the number of vehicles present on a predefined distance of the roadway at a particular timestamp (e.g., 40 vehicles/km), and the flow rate on the roadway may indicate the number of vehicles travelling on the roadway that pass a static point of observation in a predefined time period at the corresponding timestamp (e.g., 4000 vehicles/h).

In block 404, the model generator 204 may generate a second traffic diagram associated with the one or more open lanes in an impeded traffic condition. In the impeded traffic condition, the first controllable vehicle 103 in the control lane and the proximate controllable vehicles 103 in the one or more impedible lanes may be controlled with the target mitigation speed, and therefore the first controllable vehicle 103 may impede the traffic stream flowing through the control lane and the proximate controllable vehicles 103 may impede the traffic streams flowing through the one or more impedible lanes in the mitigation road segment. Thus, the traffic stream flowing through the control lane in the mitigation road segment and the traffic streams flowing through the one or more impedible lanes in the mitigation road segment may be impeded, while the traffic streams flowing through the one or more open lanes in the mitigation road segment may not be impeded in the unimpeded traffic condition.

In some embodiments, the second traffic diagram associated with the one or more open lanes in the impeded traffic condition may describe traffic flow in the one or more open lanes of the roadway as the control lane and the one or more impedible lanes are impeded while the one or more open lanes are not impeded in the mitigation road segment of the roadway. In some embodiments, the second traffic diagram may indicate a relationship between the flow rate and the vehicle density in the one or more open lanes of the roadway, and/or a relationship between the vehicle speed and the vehicle density in the one or more open lanes of the roadway in the impeded traffic condition. Similar to the first traffic diagram, the vehicle density in the one or more open lanes of the roadway may indicate the number of vehicles present on a predefined distance of the one or more open lanes at a particular timestamp (e.g., 15 vehicles/km), and the flow rate in the one or more open lanes of the roadway may indicate the number of vehicles travelling in the one or more open lanes that pass a static point of observation in a predefined time period at the corresponding timestamp (e.g., 2700 vehicles/h).

Figure 5:
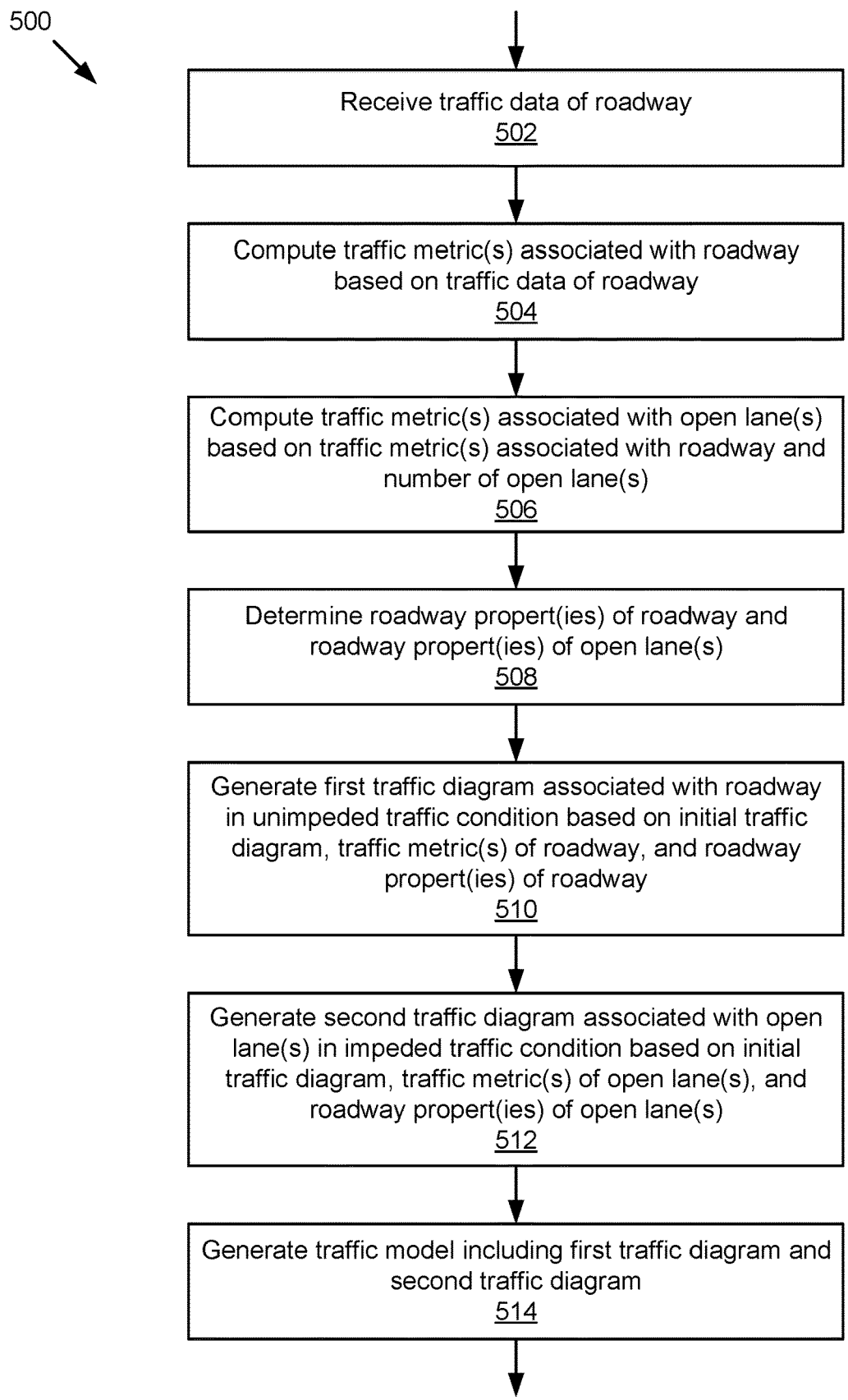
FIG. 5 is a flowchart of an example method for generating a traffic model associated with a mitigation road segment of the roadway.

FIG. 5 is a flowchart of an example method 500 for generating a traffic model associated with the mitigation road segment of the roadway, the traffic model may include the first traffic diagram associated with the roadway in the unimpeded traffic condition and the second traffic diagram associated with the one or more open lanes in the impeded traffic condition. In block 502, the model generator 204 may receive traffic data of the roadway. For example, the model generator 204 may receive traffic data of the roadway from the traffic monitoring devices 109. As discussed elsewhere herein, the traffic data of the roadway may describe the traffic on various road segments of the roadway at multiple timestamps. For each road segment of the roadway at each timestamp, the traffic data of the roadway may include the vehicle density (e.g., 40 vehicles/km), the flow rate (e.g., 4000 vehicles/h), the vehicle speed (e.g., 100 km/h), etc., associated with the road segment at the corresponding timestamp.

In block 504, the model generator 204 may compute one or more traffic metrics associated with the roadway based on the traffic data of the roadway. The traffic metrics associated with the roadway may indicate various properties of the traffic flow on the roadway. In some embodiments, the model generator 204 may determine the roadway capacity indicating the maximum flow rate of the roadway (e.g., 5400 vehicles/hour), the capacity vehicle density indicating the vehicle density of the roadway as the vehicles travel on the roadway with the flow rate equal to the roadway capacity (e.g., 60 vehicles/km), the jam vehicle density indicating the vehicle density of the roadway as the vehicles remain unmoved on the roadway due to traffic congestion (e.g., 180 vehicles/km), etc. Other traffic metrics are also possible and contemplated.

In block 506, the model generator 204 may compute one or more traffic metrics associated with the one or more open lanes of the roadway based on the traffic metrics associated with the roadway and the number of open lanes in the mitigation road segment. The traffic metrics associated with the one or more open lanes may indicate various properties of the traffic flow flowing through the one or more open lanes of the roadway. In some embodiments, the traffic metric associated with the one or more open lanes may be directly proportional to the number of open lanes in the mitigation road segment. As an example, in the traffic context depicted in FIG. 10A, the roadway 1000 may include 4 lanes and the mitigation road segment 1020 may include 1 open lane among these 4 lanes (e.g., the lane 1007). In this example, the model generator 204 may determine the roadway capacity of the roadway 1000 to be 5400 vehicles/hour, and determine the roadway capacity of the one or more open lanes in the roadway 1000 to be 1350 vehicles/hour (e.g., 5400/4).

In block 508, the model generator 204 may determine one or more roadway properties of the roadway. In some embodiments, the roadway properties of the roadway may indicate the static properties associated with the roadway (e.g., speed limit, number of lanes, etc.). The model generator 204 may also determine roadway properties of the one or more open lanes in the mitigation road segment of the roadway. Similarly, the roadway properties of the one or more open lanes may indicate the static properties associated with the one or more open lanes (e.g., speed limit, number of open lanes, etc.). Continuing the example in FIG. 10A, the model generator 204 may determine that the roadway 1010 includes 4 lanes with the speed limit of 120 km/h. In this example, the model generator 204 may also determine that the one or more open lanes in the mitigation road segment 1020 of the roadway 1010 includes 1 open lane with the speed limit of 120 km/h. It should be understood that other roadway properties are also possible and contemplated.

In block 510, the model generator 204 may generate the first traffic diagram associated with the roadway in the unimpeded traffic condition based on an initial traffic diagram, the traffic metrics associated with the roadway, and the roadway properties of the roadway. In some embodiments, the model generator 204 may retrieve the initial traffic diagram from the vehicle data store 121. The initial traffic diagram may be a fundamental diagram for describing a traffic flow with one or more relationships between the flow rate, the vehicle density, the vehicle speed, etc., associated with the traffic flow. In some embodiments, the model generator 204 may adjust one or more diagram parameters, coefficient values, etc., of the initial traffic diagram using the traffic metrics associated with the roadway (e.g., roadway capacity, capacity vehicle density, jam vehicle density, etc.) and the roadway properties of the roadway (e.g., speed limit, number of lanes, etc.), thereby generating the first traffic diagram associated with the roadway in the unimpeded traffic condition. As discussed elsewhere herein, the first traffic diagram associated with the roadway in the unimpeded traffic condition may describe the traffic flow on the roadway as all lanes of the roadway are not impeded. In this present disclosure, the first traffic diagram associated with the roadway in the unimpeded traffic condition may be referred to simply as the first traffic diagram.

In block 512, the model generator 204 may generate the second traffic diagram associated with the one or more open lanes in the impeded traffic condition based on the initial traffic diagram, the traffic metrics associated with the one or more open lanes, and the roadway properties of the one or more open lanes. Similar to generating the first traffic diagram, the model generator 204 may adjust one or more diagram parameters, coefficient values, etc., of the initial traffic diagram using the traffic metrics associated with the one or more open lanes and the roadway properties of the one or more open lanes, thereby generating the second traffic diagram associated with the one or more open lanes in the impeded traffic condition. As discussed elsewhere herein, the second traffic diagram associated with the one or more open lanes in the impeded traffic condition may describe the traffic flow flowing through the one or more open lanes of the roadway as the control lane and the one or more impedible lanes are impeded while the one or more open lanes are not impeded in the mitigation road segment of the roadway. In this present disclosure, the second traffic diagram associated with the one or more open lanes in the impeded traffic condition may be referred to simply as the second traffic diagram.

In block 514, the model generator 204 may generate a traffic model associated with the mitigation road segment of the roadway. The traffic model may include the first traffic diagram associated with the roadway in the unimpeded traffic condition and the second traffic diagram associated with the one or more open lanes in the impeded traffic condition. In some embodiments, the model generator 204 may aggregate the first traffic diagram and the second traffic diagram in the same coordinate system to generate the traffic model.

Figure 9B:
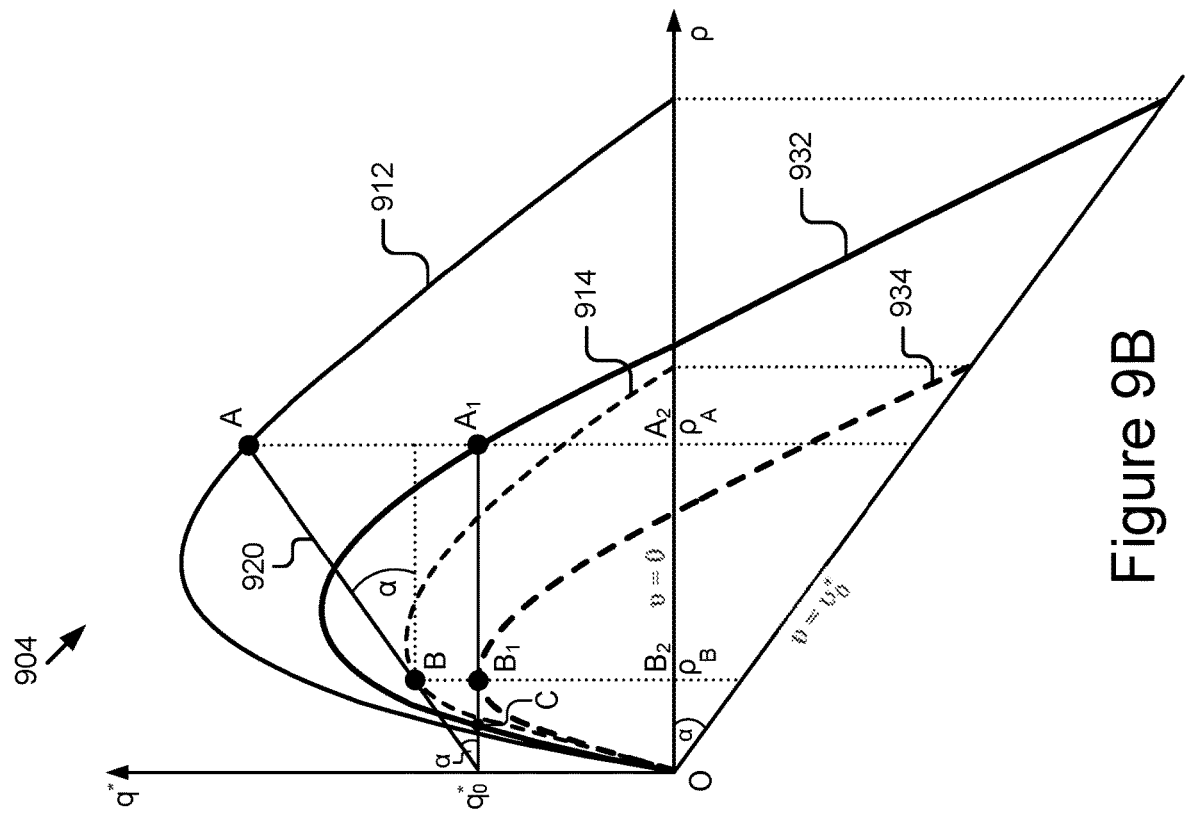
FIG. 9B illustrates an example vehicle passing model associated with the mitigation road segment of the roadway.
Figure 9A:
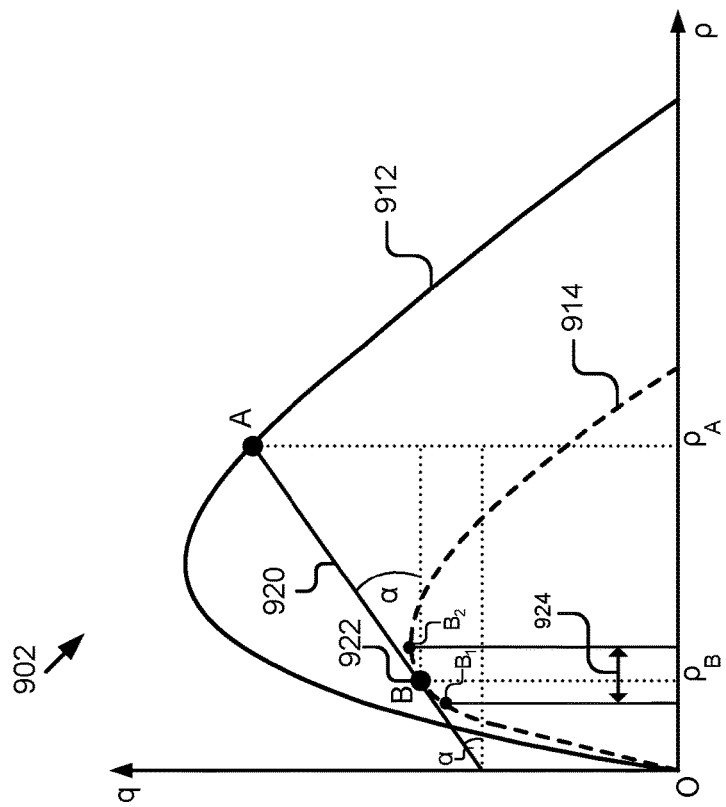
FIG. 9A illustrates an example traffic model associated with the mitigation road segment of the roadway.

FIG. 9A illustrates an example traffic model 902 associated with the mitigation road segment of the roadway. As shown, the traffic model 902 may include the first traffic diagram 912 associated with the roadway in the unimpeded traffic condition and the second traffic diagram 914 associated with the one or more open lanes in the impeded traffic condition. Thus, the first traffic diagram 912 may describe the traffic flow flowing through all lanes of the roadway as all lanes of the roadway are not impeded in the unimpeded traffic condition. The second traffic diagram 914 may describe the traffic flow flowing through the one or more open lanes of the roadway as the control lane is impeded by the first controllable vehicle 103, the one or more impedible lanes 1003 are impeded by the proximate controllable vehicle 103, and the one or more open lanes are not impeded in the unimpeded traffic condition.

As depicted in FIG. 9A, the first traffic diagram 912 and the second traffic diagram 914 may describe their corresponding traffic flow with the relationship between the flow rate q and the vehicle density ρ associated with the corresponding traffic flow. In some embodiments, the flow rate q, the vehicle density ρ, and the vehicle speed v associated with a traffic flow may be related to one another by the following Equation 1:

$$\text{flow rate } q = \text{vehicle density } \rho * \text{vehicle speed } v \quad [1]$$

In some embodiments, once the model generator 204 generates a traffic diagram indicating the relationship between a pair of factors for the traffic flow (e.g., the flow rate q and the vehicle density ρ), the model generator 204 may derive other traffic diagrams indicating the relationship between other pairs of factors for the traffic flow (e.g., the vehicle speed v and the vehicle density ρ, the vehicle speed v and the flow rate q, etc.) from that previously generated traffic diagram using Equation 1. In this present disclosure, the traffic diagram may refer to the traffic diagram indicating the relationship between the flow rate q and the vehicle density ρ of the traffic flow, the traffic diagram indicating the relationship between the vehicle speed v and the vehicle density ρ of the traffic flow, etc. Other types of traffic diagram are also possible and contemplated.

Figure 6:
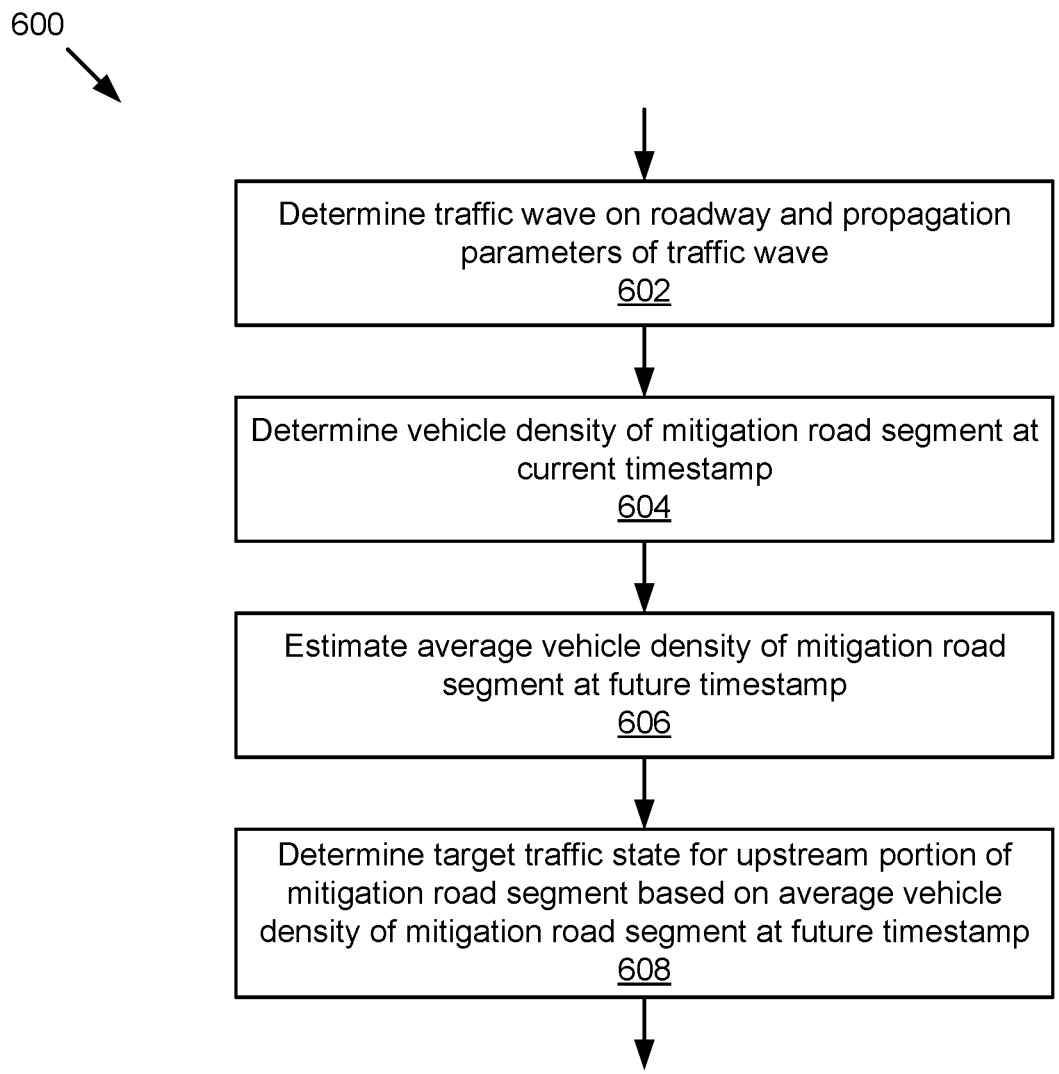
FIG. 6 is a flowchart of an example method for determining a target traffic state for an upstream portion of the mitigation road segment.

Referring back to FIG. 4, in block 406, the traffic oscillation analyzer 206 may determine a target traffic state for an upstream portion of the mitigation road segment, the upstream portion of the mitigation road segment may be located upstream of the first controllable vehicle 103 in the mitigation road segment. FIG. 6 is a flowchart of an example method 600 for determining the target traffic state for the upstream portion of the mitigation road segment. In some embodiments, the target traffic state for the upstream portion of the mitigation road segment may be determined based on the traffic wave propagating along the roadway.

In block 602, the traffic oscillation analyzer 206 may determine the traffic wave on the roadway and one or more propagation parameters of the traffic wave. The traffic wave on the roadway is usually caused by the traffic congestion. Non-limiting examples of the traffic wave include, but are not limited to, a shockwave, a rarefraction wave, etc. As an example of a traffic wave, when traffic congestion occurs, the vehicles need to stop when they reach the congested area. Thus, the traffic congestion may cause behind it a traffic stop region in which the vehicles cannot move forward due to the traffic congestion, and a traffic moving region in which the vehicles may still move forward. As the number of vehicles reaching the congested area from behind is generally higher than the number of vehicles leaving the congested area at the front, the traffic stop region often expands backward as more upstream vehicles approach the congested area. As a result, the boundary line between the traffic stop region and the traffic moving region is usually not stationary. Instead, the boundary line between the traffic stop region and the traffic moving region generally travels backward in the form of a traffic wave (e.g., a shockwave) that propagates along the roadway in the upstream direction opposite to the moving direction of the vehicles.

Figure 7:
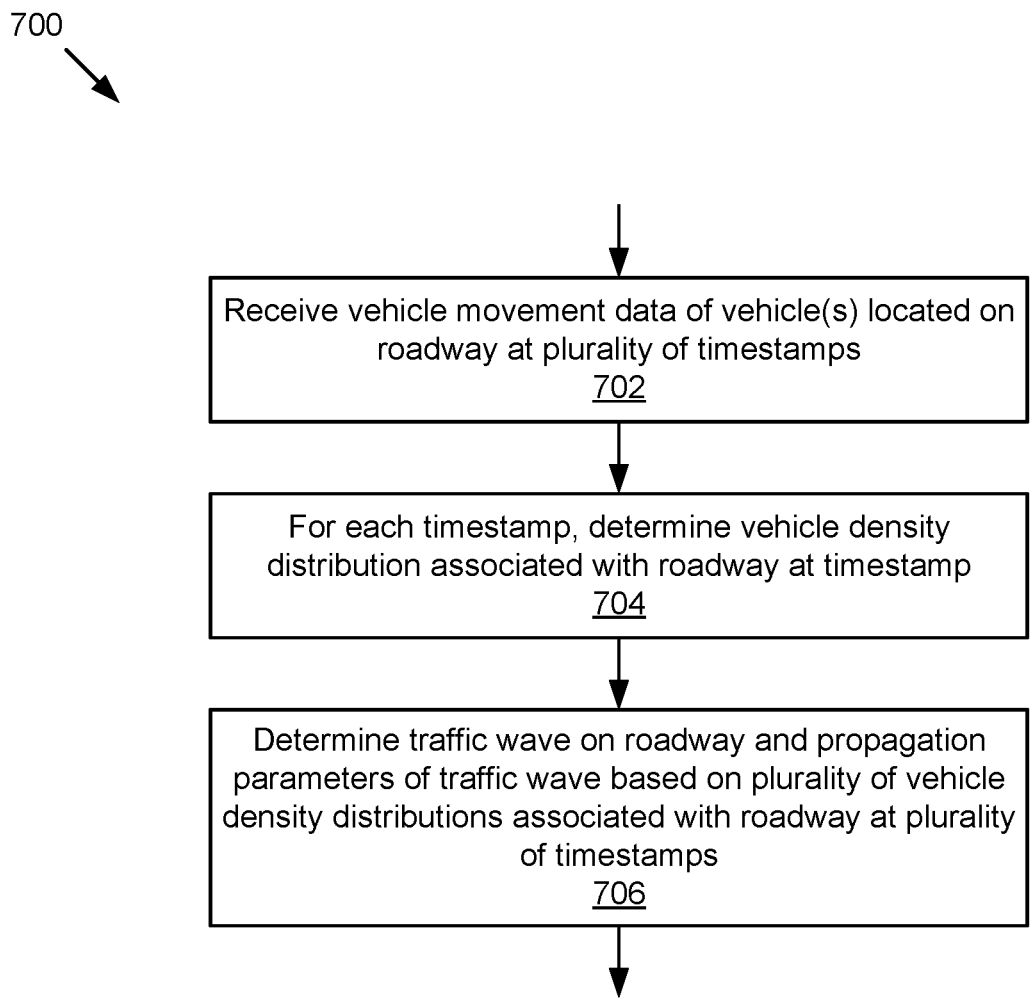
FIG. 7 is a flowchart of an example method for determining a traffic wave on the roadway and propagation parameters of the traffic wave.

FIG. 7 is a flowchart of an example method 700 for determining the traffic wave on the roadway and propagation parameters of the traffic wave. In block 702, the traffic oscillation analyzer 206 may receive vehicle movement data of one or more vehicles located on the roadway at multiple timestamps. In some embodiments, as the controllable vehicles 103 and/or the responsive vehicles 107 travel along the roadway, these vehicles may periodically transmit their vehicle movement data to the server 101 and/or to other vehicles located within their communication range at a predefined interval (e.g., every 2 s, 5 s, 10 s, etc.). Thus, the traffic oscillation analyzer 206 may receive the vehicle movement data of the controllable vehicles 103 and/or the responsive vehicles 107 located on various road segments of the roadway at multiple timestamp. As discussed elsewhere herein, the vehicle movement data of a vehicle at a particular timestamp may include the vehicle location (e.g., GPS coordinates), the vehicle speed, the vehicle lane (e.g., lane number), etc., of the vehicle at the corresponding timestamp. Other types of vehicle movement data are also possible and contemplated.

In block 704, for each timestamp, the traffic oscillation analyzer 206 may determine a vehicle density distribution associated with the roadway at the corresponding timestamp. The vehicle density distribution may describe the vehicle density at various road segments of the roadway at the corresponding timestamp, and may be determined based on the vehicle movement data of the vehicles located on the roadway at the corresponding timestamp and the first traffic diagram associated with the roadway in the unimpeded traffic condition. As discussed elsewhere herein, the first traffic diagram associated with the roadway in the unimpeded traffic condition may describe the traffic flow on the roadway in the unimpeded traffic condition with the relationship between the vehicle speed v and the vehicle density ρ associated with the traffic flow.

In some embodiments, to generate the vehicle density distribution associated with the roadway at the timestamp $t=t_1$, the traffic oscillation analyzer 206 may analyze the vehicle movement data of various vehicles located on the roadway (e.g., the controllable vehicles 103 and/or the responsive vehicles 107), and determine the vehicle location, the vehicle speed, the vehicle lane, etc., of these vehicles at the timestamp $t=t_1$. For each vehicle among these vehicles, the traffic oscillation analyzer 206 may determine the road segment of the roadway that includes the vehicle location of the vehicle at the timestamp $t=t_1$, and determine the vehicle density ρ of the road segment at the timestamp $t=t_1$ based on the vehicle speed $v_1$ of the vehicle travelling on the road segment at the timestamp $t=t_1$, and the relationship between the vehicle speed v and the vehicle density ρ associated with the traffic flow on the roadway indicated by the first traffic diagram (the first traffic diagram associated with the roadway in the unimpeded traffic condition in which all lanes are unimpeded). In some embodiments, if the road segment includes multiple controllable vehicles 103 and/or responsive vehicles 107 at the timestamp $t=t_1$, the traffic oscillation analyzer 206 may compute an average vehicle speed of these vehicles, and determine the vehicle density $\rho_1$ of the road segment at the timestamp $t=t_1$ using the average vehicle speed of these vehicles in a similar manner.

In some embodiments, once the vehicle density $\rho_1$ in various road segments of the roadway at the timestamp $t=t_1$ are determined, the traffic oscillation analyzer 206 may aggregate the vehicle density $\rho_1$ of various road segments into the vehicle density distribution associated with the roadway at the timestamp $t=t_1$. In some embodiments, the traffic oscillation analyzer 206 may apply additional processing to smooth the vehicle density distribution associated with the roadway at the timestamp $t=t_1$, thereby increasing its accuracy.

In block 706, the traffic oscillation analyzer 206 may determine the traffic wave on the roadway and one or more propagation parameters of the traffic wave. In some embodiments, once the vehicle density distribution associated with the roadway at various timestamps $t_1 \ldots t_n$ are determined, the traffic oscillation analyzer 206 may analyze the vehicle density distributions associated with the roadway at various timestamps, and determine the traffic wave on the roadway based on these vehicle density distributions. In some embodiments, the traffic oscillation analyzer 206 may also apply a kinematic wave model to the vehicle density distributions associated with the roadway at various timestamps to determine the propagation parameters of the traffic wave. In some embodiments, the propagation parameters may describe the propagation of the traffic wave along the roadway over time. Non-limiting examples of the propagation parameters of the traffic wave include, but are not limited to, the propagation speed (e.g., 15 km/h), the propagation distance, the coverage area of the traffic stop region associated with the traffic wave, the coverage area of the traffic moving region associated with the traffic wave, etc. Other propagation parameters of the traffic wave are also possible and contemplated.

Referring back to FIG. 6, in block 604, the traffic oscillation analyzer 206 may determine the vehicle density of the mitigation road segment at the current timestamp $t=t_{current}$. In some embodiments, the traffic oscillation analyzer 206 may determine a vehicle (e.g., a controllable vehicle 103 or a responsive vehicle 107) located in the mitigation road segment at the current timestamp $t=t_{current}$. For example, the traffic oscillation analyzer 206 may determine the vehicle location, the vehicle speed, the vehicle lane, etc., of the vehicle at the current timestamp $t=t_{current}$ from the vehicle movement data of the vehicle, and determine that the vehicle location of the vehicle at the current timestamp $t=t_{current}$ is included in the mitigation road segment. The traffic oscillation analyzer 206 may then determine the vehicle density $\rho_{current}$ of the mitigation road segment at the current timestamp $t=t_{current}$ based on the vehicle speed of the vehicle at the current timestamp $t=t_{current}$, and the relationship between the vehicle speed v and the vehicle density ρ associated with the traffic flow on the roadway indicated by the first traffic diagram (the first traffic diagram associated with the roadway in the unimpeded traffic condition in which all lanes are unimpeded). In some embodiments, if the mitigation road segment includes multiple controllable vehicles 103 and/or responsive vehicles 107 at the timestamp $t=t_{current}$, the traffic oscillation analyzer 206 may compute an average vehicle speed of these vehicles, and determine the vehicle density $\rho_{current}$ of the mitigation road segment at the timestamp $t=t_{current}$ using the average vehicle speed of these vehicles in a similar manner. Continuing the example in FIG. 10A, the traffic oscillation analyzer 206 may determine the vehicle density $\rho_{current}$ of the mitigation road segment 1020 at the current timestamp $t=t_{current}$ to be 40 vehicles/km.

In block 606, the traffic oscillation analyzer 206 may estimate the vehicle density of the mitigation road segment at the future timestamp $t=t_{future}$. In some embodiments, the traffic oscillation analyzer 206 may determine the future timestamp $t=t_{future}=t_{current}+\Delta_t$, in which $\Delta_t$ may be a predefined time distance between the current timestamp $t=t_{current}$ and the future timestamp $t=t_{future}$ (e.g., 2 s, 5 s, 10 s, etc.). In some embodiments, the traffic oscillation analyzer 206 may estimate the average vehicle density $\rho_{future}$ of the mitigation road segment at the future timestamp $t=t_{future}$ based on the vehicle density $\rho_{current}$ of the mitigation road segment at the current timestamp $t=t_{current}$ and the propagation parameters of the traffic wave. As discussed elsewhere herein, the propagation parameters of the traffic wave may describe the propagation of the traffic wave along the roadway over time. Continuing the example in FIG. 10A, the traffic oscillation analyzer 206 may estimate the average vehicle density $\rho_{future}$ of the mitigation road segment 1020 at the future timestamp $t=t_{future}=(t_{current}+2\ s)$ to be 60 vehicles/km.

In block 608, the traffic oscillation analyzer 206 may determine the target traffic state for the upstream portion of the mitigation road segment based on the average vehicle density $\rho_{future}$ of the mitigation road segment at the future timestamp $t=t_{future}$. In some embodiments, the target traffic state for the upstream portion of the mitigation road segment may be the steady state that has the vehicle density equal to the average vehicle density $\rho_{future}$ of the mitigation road segment at the future timestamp $t=t_{future}$. This implementation is particularly advantageous, because the target mitigation speed determined based on this target traffic state and applied to the first controllable vehicle 103 and/or the proximate controllable vehicles 103 can transition the upstream portion of the mitigation road segment directly to the target traffic state. As the target traffic state may have the vehicle density equal to the average vehicle density $\rho_{future}$ of the mitigation road segment at the future timestamp $t=t_{future}$, this implementation can prevent the traffic wave from further propagating upstream of the roadway, thereby smoothing the traffic oscillation for the vehicles located upstream of the mitigation road segment.

In some embodiments, the traffic oscillation analyzer 206 may determine the target traffic state for the upstream portion of the mitigation road segment on the first traffic diagram associated with the roadway in the unimpeded traffic condition. In particular, the traffic oscillation analyzer 206 may position the target traffic state for the upstream portion of the mitigation road segment onto the first traffic diagram based on the average vehicle density $\rho_{future}$ of the mitigation road segment at the future timestamp $t=t_{future}$. For example, as depicted in FIG. 9A, the traffic oscillation analyzer 206 may position the target traffic state A for the upstream portion of the mitigation road segment onto the first traffic diagram 912 associated with the roadway in the unimpeded traffic condition based on the estimated average vehicle density of the mitigation road segment at the future timestamp $t=t_{future}$ (e.g., 60 vehicles/km).

Referring back to FIG. 4, in block 408, the target speed calculator 208 may determine the target mitigation speed for the first controllable vehicle 103 based on the first traffic diagram associated with the roadway in the unimpeded traffic condition, the second traffic diagram associated with the one or more open lanes in the impeded traffic condition, and the target traffic state for the upstream portion of the mitigation road segment. As discussed elsewhere herein, the target mitigation speed may be applied to the first controllable vehicle 103 in the control lane and/or the proximate controllable vehicles 103 in the impedible lanes of the mitigation road segment.

In some embodiments, to determine the target mitigation speed, the target speed calculator 208 may determine a tangent line in the traffic model, the tangent line may include the target traffic state on the first traffic diagram associated with the roadway in the unimpeded traffic condition and may be tangent to the second traffic diagram associated with the one or more open lanes in the impeded traffic condition. For example, as depicted in FIG. 9A, the target speed calculator 208 may determine the tangent line 920, the tangent line 920 may include the target traffic state A on the first traffic diagram 912 and may be tangent to the second traffic diagram 914. As discussed elsewhere herein, the first traffic diagram 912 may describe the traffic flow flowing through all lanes of the roadway as all lanes of the roadway are not impeded in the unimpeded traffic condition. The second traffic diagram 914 may describe the traffic flow flowing through the one or more open lanes of the roadway as the control lane and the one or more impedible lanes are respectively impeded by the first controllable vehicle 103 and the proximate controllable vehicles 103 while the one or more open lanes are not impeded in the impeded traffic condition. The target traffic state A may be the target traffic state for the upstream portion of the mitigation road segment and may have the vehicle density equal to the average vehicle density of the mitigation road segment at the future timestamp $t=t_{future}$.

In some embodiments, the target speed calculator 208 may determine an initiation traffic state of the one or more open lanes on the second traffic diagram based on the tangent line. The initiation traffic state of the one or more open lanes may indicate the traffic state of the one or more open lanes in the impeded traffic condition at the start point of mitigation process, and may be used to determine the target mitigation speed applied to the first controllable vehicle 103 in the control lane and the proximate controllable vehicles 103 in the impedible lanes to perform the mitigation.

As depicted in FIG. 9A, to determine the initiation traffic state of the one or more open lanes, the target speed calculator 208 may determine the tangent point 922 at which the tangent line 920 is tangent to the second traffic diagram 914 associated with the one or more open lanes in the impeded traffic condition, and determine the initiation traffic state B of the one or more open lanes to be the tangent point 922. Alternatively, the target speed calculator 208 may determine a proximate range $B_1B_2$ associated with the tangent point 922 on the second traffic diagram 914, the proximate range $B_1B_2$ may have a predefined size (e.g., as indicated by the distance 924) and may include multiple traffic states on the second traffic diagram 914 that are proximate to the tangent point 922. The target speed calculator 208 may then randomly determine the initiation traffic state B of the one or more open lanes from the proximate range $B_1B_2$ on the second traffic diagram 914. Other implementations for determining the initiation traffic state of the one or more open lanes are also possible and contemplated.

In some embodiments, the target speed calculator 208 may determine the state transition line in the traffic model. As depicted in FIG. 9A, the target speed calculator 208 may determine the state transition line AB that includes the initiation traffic state B of the one or more open lanes located on the second traffic diagram 914 (the second traffic diagram associated with the one or more open lanes in the impeded traffic condition), and the target traffic state A for the upstream portion of the mitigation road segment located on the first traffic diagram 912 (the first traffic diagram associated with the roadway in the unimpeded traffic condition). As depicted in FIG. 9A, if the target speed calculator 208 determines the initiation traffic state B of the one or more open lanes to be the tangent point 922 at which the tangent line 920 is tangent to the second traffic diagram 914, the state transition line AB and the tangent line 920 may be coincident, and the state transition line AB may be tangent to the second traffic diagram 914 at the initiation traffic state B. On the other hand, if the target speed calculator 208 determines the initiation traffic state B of the one or more open lanes from the proximate range $B_1B_2$ associated with the tangent point 922, the state transition line AB may be substantially tangent to the second traffic diagram 914.

In some embodiments, the target speed calculator 208 may determine the target mitigation speed for the first controllable vehicle 103 and/or the proximate controllable vehicles 103 based on the state transition line AB. In particular, the target speed calculator 208 may determine the target mitigation speed $v^*_0$ being applied to the first controllable vehicle 103 and/or the proximate controllable vehicles 103 to be the slope of the state transition line AB. As depicted in FIG. 9A, the slope of the state transition line AB may be the tangent of the angle $\alpha$, and thus the target mitigation speed $v^*_0$ may equal to $\mathrm{Tan}(\alpha)$. In some embodiments, the target mitigation speed $v^*_0$ may be lower than the speed limit of the roadway and generally lower than vehicle speed at which the surrounding vehicles travel on the roadway.

As discussed above, the state transition line AB may include the initiation traffic state B of the one or more open lanes in the impeded traffic condition, the initiation traffic state B may indicate the traffic state of the one or more open lanes as the control lane and the one or more impedible lanes are respectively impeded by the first controllable vehicle 103 and the proximate controllable vehicles 103 at the start point of the mitigation process. The state transition line AB may also include the target traffic state A for the upstream portion of the mitigation road segment in the unimpeded traffic condition. Thus, as the first controllable vehicle 103 and the proximate controllable vehicles 103 travel at the target mitigation speed $v^*_0$ equal to the slope of the state transition line AB in their corresponding lane, the initiation traffic state B may be transitioned to achieve the target traffic state A. As a result, the upstream portion of the mitigation road segment may be transitioned to the target traffic state A. As discussed elsewhere herein, the target traffic state A may have the vehicle density equal to the average vehicle density of the mitigation road segment 1020 at the future timestamp $t=t_{future}$. Thus, as the upstream portion of the mitigation road segment 1020 is transitioned to the target traffic state A, the traffic wave may be prevented from further propagating upstream of the roadway.

Additionally, if the mitigation road segment includes a single (e.g., only one) open lane, as the first controllable vehicle 103 and the proximate controllable vehicles 103 travel at the target mitigation speed $v^*_0$ equal to the slope of the state transition line AB in their corresponding lane, the passing flow rate at which the traffic stream flowing through the only open lane passes the first controllable vehicle 103 and/or the proximate controllable vehicles 103 travelling in their corresponding lane may be maximized, given the target traffic state A that needs to be achieved. If the mitigation road segment includes multiple open lanes, as the first controllable vehicle 103 and the proximate controllable vehicles 103 travel at the target mitigation speed $v^*_0$ equal to the slope of the state transition line AB in their corresponding lane, the overall passing flow rate at which the traffic flow flowing through the multiple open lanes passes the first controllable vehicle 103 and/or the proximate controllable vehicles 103 travelling in their corresponding lane may be maximized, given the target traffic state A that needs to be achieved. This advantageous effect is described in detail below with reference to FIG. 9B.

FIG. 9B illustrates an example vehicle passing model 904 associated with the mitigation road segment of the roadway, the vehicle passing model 904 may be generated based on the traffic model 902 associated with the mitigation road segment of the roadway. As discussed elsewhere herein, the traffic model 902 may include the traffic diagrams describing the relationship between the flow rate q and the vehicle density ρ of various traffic flows, each traffic flow may flow through one or more particular lanes in a particular traffic condition. For example, the second traffic diagram 914 in the traffic model 902 may describe the relationship between the flow rate q and the vehicle density ρ of the traffic flow flowing through one or more open lanes of the roadway in the impeded traffic condition. In some embodiments, the vehicle passing model 904 may include the corresponding passing diagrams that describe the relationship between the passing flow rate q* and the vehicle density ρ of these traffic flows.

In some embodiments, the flow rate q of the traffic flow flowing through the particular lane(s) may indicate the number of vehicles travelling in these particular lane(s) that pass a static point of observation in a predefined time period. On the other hand, the passing flow rate q* of the same traffic flow may indicate the number of vehicles travelling in these particular lane(s) that pass a dynamic point of observation as the dynamic point of observation travels at the observer speed $v_O$. In some embodiments, the flow rate q and the passing flow rate q* of the same traffic flow may be related to one another by the following Equation 2:

passing flow rate $q^*$=flow rate $q$−observer speed
$v_O^*$vehicle density ρ    [2]

Thus, in some embodiments, the model generator 204 may derive the passing diagrams of the vehicle passing model 904 from the corresponding traffic diagrams of the traffic model 902 using the Equation 2 and the observer speed $v_O$ of the dynamic point of observation. An example of the dynamic point of observation may be the first controllable vehicle 103 and/or the proximate controllable vehicles 103 travelling in their corresponding lane at the vehicle speed $v=v_O$.

According to Equation 2, if the first controllable vehicle 103 and the proximate controllable vehicles 103 travel in their corresponding lane at the vehicle speed v=0, the observer speed $v_O$=0 and the passing flow rate q*=the flow rate q. Therefore, as depicted in FIG. 9B, the model generator 204 may consider the first traffic diagram 912 and the second traffic diagram 914 in the traffic model 902 to be the corresponding passing diagrams in the vehicle passing model 904 for the scenario in which the first controllable vehicle 103 and the proximate controllable vehicles 103 travel in their corresponding lane at the vehicle speed v=0. In some embodiments, if the first controllable vehicle 103 and the proximate controllable vehicles 103 travel in their corresponding lane at the target mitigation speed $v^*_0$, the observer speed $v_O$=the target mitigation speed $v^*_0$=Tan(α). As depicted in FIG. 9B, the model generator 204 may generate the first passing diagram 932 corresponding to the first traffic diagram 912 and generate the second passing diagram 934 corresponding to the second traffic diagram 914 for the scenario in which the first controllable vehicle 103 and the proximate controllable vehicles 103 travel in their corresponding lane at the target mitigation speed $v^*_0$=Tan(α). According to Equation 2, the first passing diagram 932 may be related to the first traffic diagram 912 and the second passing diagram 934 may be related to the second traffic diagram 914 by the following Equation 3:

$q^*=q-\text{Tan}(\alpha)^*\rho$    [3]

According to Equation 3, the passing flow rate $q^*_B$ corresponding to the initiation traffic state B and the passing flow rate $q^*_A$ corresponding to the target traffic state A may be determined as follows:

$q^*_B=q_B-\text{Tan}(\alpha)^*\rho_B=BB_2-BB_1=B_1B_2=q^*_0$    [4]

$q^*_A=q_A-\text{Tan}(\alpha)^*\rho_A=AA_2-AA_1=A_1A_2=q^*_0$    [5]

As indicated in Expression 4, $q^*_B=B_1B_2$, and thus the initiation traffic state B located on the second traffic diagram 914 may be corresponding to the initiation traffic state $B_1$ located on second passing diagram 934 for the scenario in which the first controllable vehicle 103 and the proximate controllable vehicles 103 travel in their corresponding lane at the target mitigation speed $v^*_0$. Similarly, as indicated in Expression 5, $q^*_A=A_1A_2$, and thus the target traffic state A located on the first traffic diagram 912 may be corresponding to the target traffic state $A_1$ located on the first passing diagram 932 for the scenario in which the first controllable vehicle 103 and the proximate controllable vehicles 103 travel in their corresponding lane at the target mitigation speed $v^*_0$.

As indicated in Expression 4 and Expression 5, the initiation traffic state $B_1$ located on second passing diagram 934 and the target traffic state $A_1$ located on the first passing diagram 932 may have the same passing flow rate $q^*_B = q^*_0$ and $q^*_A = q^*_0$, due to the state transition line AB being tangent to the second traffic diagram 914 at the initiation traffic state B and the target mitigation speed $v^*_0$ applied to the first controllable vehicle 103 and the proximate controllable vehicles 103 being equal to the slope of the state transition line AB (e.g., $\text{Tan}(\alpha)$) as depicted in FIG. 9B. Thus, the initiation traffic state $B_1$ located on second passing diagram 934 and the target traffic state $A_1$ located on the first passing diagram 932 may belong to the same horizontal line corresponding to the passing flow rate $q^* = q^*_0$ as depicted in FIG. 9B.

In some embodiments, if the mitigation road segment includes a single open lane, the initiation traffic state $B_1$ may indicate the passing flow rate at which the traffic stream flowing through the only open lane passes the first controllable vehicle 103 and/or the proximate controllable vehicles 103 travelling in their corresponding lane at the target mitigation speed $v^*_0$. If the mitigation road segment includes multiple open lanes, the initiation traffic state $B_1$ may indicate the overall passing flow rate at which the traffic flow flowing through the multiple open lane passes the first controllable vehicle 103 and/or the proximate controllable vehicles 103 travelling in their corresponding lane at the target mitigation speed $v^*_0$. Thus, as the initiation traffic state $B_1$ located on second passing diagram 934 and the target traffic state $A_1$ located on the first passing diagram 932 belong to the same horizontal line corresponding to the passing flow rate $q^* = q^*_0$ as depicted in FIG. 9B, the passing flow rate or the overall passing flow rate indicated by the initiation traffic state $B_1$ can be maximized, given the target traffic state $A_1$ corresponding to the target traffic state A that needs to be achieved. Accordingly, as the first controllable vehicle 103 and/or the proximate controllable vehicles 103 travel in their corresponding lane at the target mitigation speed $v^*_0$, these controllable vehicles 103 may impede the traffic stream in their corresponding lane to maximize the number of vehicles passing them through the one or more open lanes as allowed by the target traffic state A that needs to be achieved.

As depicted in FIG. 9B, the target speed calculator 208 may determine the initiation traffic state B to be the tangent point 922 of the tangent line 920, and thus the state transition line AB may be tangent to the second traffic diagram 914 at the initiation traffic state B in the vehicle passing model 904. As discussed above, this implementation may result in the passing flow rate or the overall passing flow rate of the traffic flow flowing through the one or more open lanes as indicated by the initiation traffic state $B_1$ being maximized. As discussed elsewhere herein, the target speed calculator 208 may determine the initiation traffic state B from the proximate range $B_1 B_2$ associated with the tangent point 922, and thus the state transition line AB may be substantially tangent to the second traffic diagram 914. While this implementation may not maximize the passing flow rate/overall passing flow rate of the traffic flow flowing through the one or more open lanes, it may increase the passing flow rate/overall passing flow rate to a value approximate to the maximal value of the passing flow rate/overall passing flow rate given the target traffic state A (e.g., the difference between these two values may satisfy a threshold difference, depending on the predefined size of the proximate range $B_1 B_2$).

In some embodiments, the target speed calculator 208 may determine the intersection between the state transition line $A_1 B_1$ corresponding to the state transition line AB and the first passing diagram 932 to be the result traffic state C.

Accordingly, as the first controllable vehicle 103 and/or the proximate controllable vehicles 103 travel in their corresponding lane at the target mitigation speed $v^*_0$, the upstream portion of the mitigation road segment may be transition to the target traffic state $A_1$ corresponding to the target traffic state A, and the road segment located downstream of the mitigation road segment but upstream of the traffic congestion (also referred to herein simply as the downstream road segment) may be transition to the result traffic state C. As indicated on the first passing diagram 932, the result traffic state C achieved in the downstream road segment may have the same passing flow rate/overall passing flow rate $q^*_0$ but have a lower vehicle density $\rho$ as compared to the target traffic state $A_1$ achieved in the upstream portion of the mitigation road segment. Thus, the result traffic state C achieved in the downstream road segment may result in a forward shockwave in which a traffic region with a lower vehicle density $\rho$ as compared to the upstream portion of the mitigation road segment may propagate forward along the roadway towards the traffic congestion, and thus the traffic congestion can be mitigated.

FIG. 10B illustrates an example 1002 of the adjusted traffic streams on the roadway 1010 to mitigate the traffic congestion situation 1000 depicted in FIG. 10A. As discussed elsewhere herein, in this example, the target mitigation speed $v^*_0$ may be applied to the first controllable vehicle C1050 travelling in the control lane 1005, the proximate controllable vehicle C1030 travelling in the impedible lane 1003, the proximate controllable vehicle C1090 travelling in the impedible lane 1009 in the mitigation road segment 1020. As discussed elsewhere herein, the target mitigation speed $v^*_0$ may be lower than the speed limit of the roadway 1010 (e.g., 120 km/h) and generally lower than the vehicle speed of other vehicles surrounding the controllable vehicles C1050, C1030, C1090. As a result, the first controllable vehicle C1050, the proximate controllable vehicle C1030, the proximate controllable vehicle C1090 may respectively impede the traffic stream in the control lane 1005, the impedible lane 1003, the impedible lane 1009 as they travel in their corresponding lane at the target mitigation speed $v^*_0$.

In this example, because the traffic streams in the control lane 1005, the impedible lane 1003, the impedible lane 1009 are impeded, other vehicles travelling behind the first controllable vehicle C1050, the proximate controllable vehicle C1030, the proximate controllable vehicle C1090 in the control lane 1005, the impedible lane 1003, the impedible lane 1009 may likely perform one or more lane change maneuvers when it is possible to shift to the open lane 1007 for faster movement as indicated by the lane-change streams 1040. As discussed elsewhere herein, the target mitigation speed $v^*_0$ applied to the controllable vehicles C1050, C1030, C1090 may maximize the passing flow rate (or increase the passing flow rate to a value approximate to the maximal value of the passing flow rate) at which the traffic stream flowing through the open lane 1007 passes the controllable vehicles C1050, C1030, C1090, given the target traffic state to be achieved in the upstream portion of the mitigation road segment 1020. Thus, the controllable vehicles C1050, C1030, C1090 may impede the traffic streams in their corresponding lane to limit the upstream traffic heading towards the congested area 1012, while still allow a portion of this upstream traffic that can be accommodated by the downstream road segment 1022 to proceed forward through the open lane 1007 to achieve the target traffic state in the upstream portion of the mitigation road segment 1020.

As depicted in FIG. 10B, once the vehicles travelling in the open lane 1007 pass the controllable vehicles C1050, C1030, and C1090, these vehicles may perform one or more lane change maneuvers when it is possible to shift from the open lane 1007 to other lanes in the downstream road segment 1022 as indicated by the lane-change streams 1042. As the traffic streams in the control lane 1005, the impedible lane 1003, the impedible lane 1009 are impeded, and only a limited portion of the upstream traffic can reach the downstream road segment 1022 through the open lane 1007, the downstream road segment 1022 may have a lower vehicle density ρ as compared to the upstream portion of the mitigation road segment 1020. Thus, as the traffic approaching the congested area 1012 from behind has a reduced vehicle density ρ and some vehicles may leave the congested area 1012 at the front, the traffic congestion in the congested area 1012 can be mitigated and eventually fully addressed.

Additionally, as discussed above, the controllable vehicles C1050, C1030, C1090 travelling at the target mitigation speed $v^*_0$ may allow a portion of the upstream traffic to proceed forward through the open lane 1007 to achieve the target traffic state in the upstream portion of the mitigation road segment 1020. As discussed elsewhere herein, the target traffic state may be the steady state that has the vehicle density equal to the average vehicle density of the mitigation road segment at the future timestamp. As the target traffic state having the vehicle density equal to the average vehicle density of the mitigation road segment at the future timestamp is achieved in the upstream portion of the mitigation road segment 1020, the traffic wave caused by the traffic congestion may be prevented from further propagating upstream of the roadway 1010. Thus, the target mitigation speed $v^*_0$ determined by the traffic mitigation application 120 when applied to the controllable vehicles C1050, C1030, C1090 can resolve the traffic congestion located downstream of the mitigation road segment 1020, and also can prevent the vehicles located upstream of the mitigation road segment 1020 from being affected by the traffic oscillation caused by the propagation of the traffic wave.

In some embodiments, once the target speed calculator 208 determines the target mitigation speed $v_0$ (e.g., 70 km/h), to apply the target mitigation speed $v^*_0$ to the first controllable vehicle 103 in the control lane and the proximate controllable vehicles 103 in the one or more impedible lanes, the traffic mitigation application 120 may provide a traffic mitigating instruction including the target mitigation speed $v^*_0$ to the first controllable vehicle 103 and the proximate controllable vehicles 103. In some embodiments, the traffic mitigation application 120 may generate and display a guidance message including the target mitigation speed $v^*_0$ to the drivers via one or more output devices of these controllable vehicles 103. For example, on a touch screen of the first controllable vehicle 103, the traffic mitigation application 120 may display a dynamic graphical map representing the vehicle location of the first controllable vehicle 103 and the traffic congestion on the roadway together with the guidance message (e.g., "Please adjust your vehicle speed to 70 km/h to help mitigating the traffic congestion and smooth the traffic oscillation"). Alternatively, the guidance message may be provided in the form of a voice instruction for the driver of the first controllable vehicle 103 to follow and adjust the vehicle speed of the first controllable vehicle 103 accordingly.

In some embodiments, the traffic mitigation application 120 may communicate the target mitigation speed $v^*_0$ (e.g., 70 km/h) to the control unit (e.g., the ECU) of the first controllable vehicle 103 and the proximate controllable vehicles 103. The control unit may actuate the speed actuators of these controllable vehicles 103 to adjust the vehicle speed of these controllable vehicles 103 to the target mitigation speed $v^*_0$. As a result, the first controllable vehicle 103 and the proximate controllable vehicles 103 may automatically adapt their vehicle speed to the target mitigation speed $v^*_0$, thereby mitigating the traffic congestion and the traffic oscillation on the roadway.

As discussed above, the traffic mitigation application 120 may apply the target mitigation speed $v^*_0$ to both the first controllable vehicle 103 and the proximate controllable vehicle 103 in the mitigation road segment. From the perspective of the first controllable vehicle 103 or the proximate controllable vehicle 103 in the mitigation road segment, the mitigation road segment may include the same number of control lane, impedible lanes, and open lanes due to the same set of controllable vehicles 103 located proximate to one another in the mitigation road segment. As a result, the traffic model 902 generated for the first controllable vehicle 103 and for each proximate controllable vehicle 103 (which includes the first traffic diagram 912 associated with the roadway in the unimpeded traffic condition and the second traffic diagram 914 associated with the one or more open lanes in the impeded traffic condition) may be identical to one another, and thus the target mitigation speed $v^*_0$ determined for the first controllable vehicle 103 and for the proximate controllable vehicles 103 may have the same value. In some embodiments, the traffic mitigation application 120 may determine the target mitigation speed $v^*_0$ for the first controllable vehicle 103, and then apply the target mitigation speed $v^*_0$ to both the first controllable vehicle 103 and the proximate controllable vehicles 103 in the mitigation road segment.

In some embodiments, to expedite the mitigation of traffic congestion and/or traffic oscillations on the roadway, the traffic mitigation application 120 may delay controlling the vehicle speed of the first controllable vehicle 103 until there are proximate controllable vehicle(s) 103 located proximate to the first controllable vehicle 103 in the mitigation road segment. This implementation is discussed in detail below with reference to FIG. 8. However, it should be understood that the traffic mitigation application 120 is capable of mitigating the traffic congestion and/or the traffic oscillations using a single controllable vehicle 103 with the embodiments discussed above.

Figure 8:
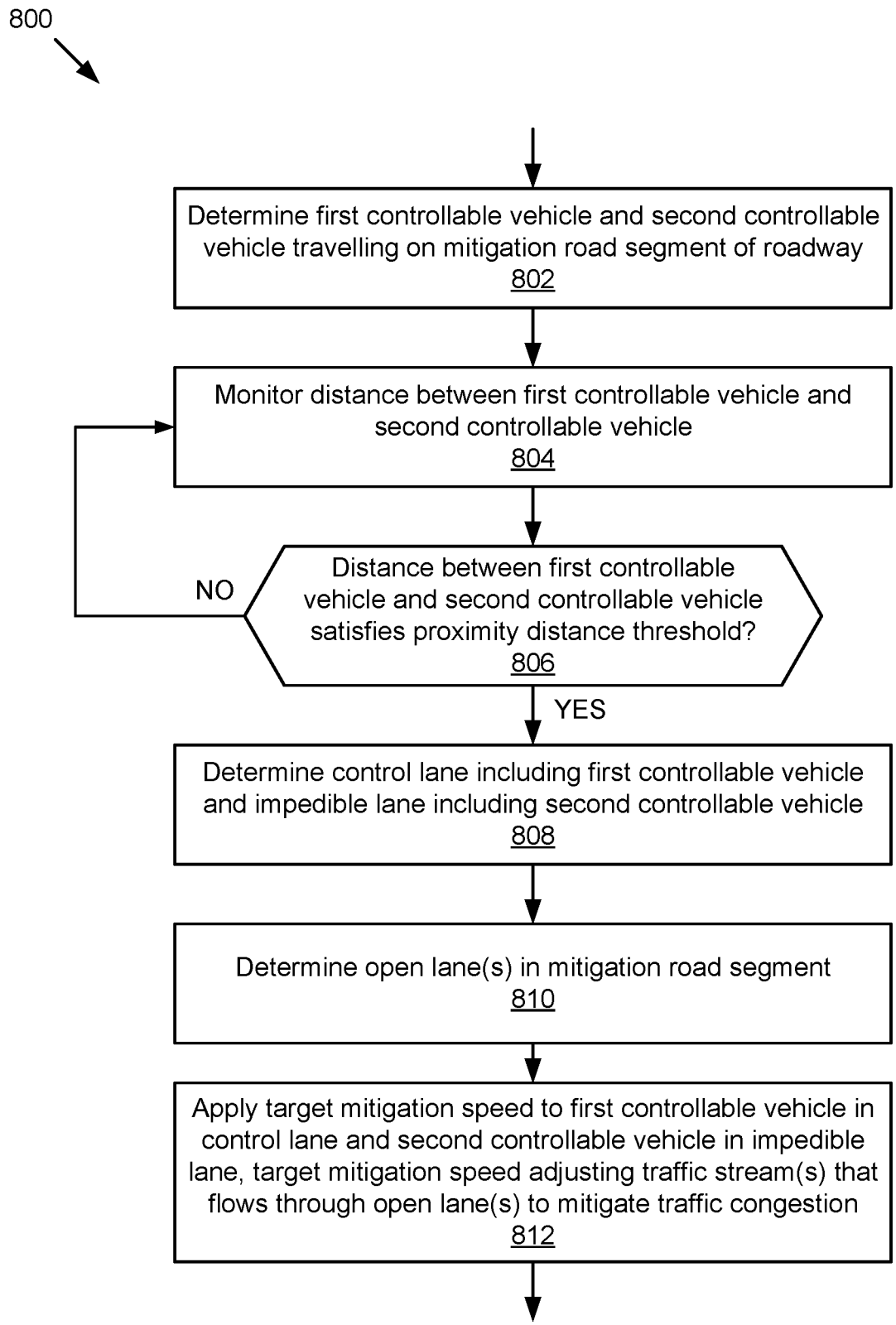
FIG. 8 is a flowchart of another example method for addressing traffic congestion and mitigating traffic oscillation.

FIG. 8 is a flowchart of an example method 800 for addressing traffic congestion and mitigating traffic oscillations. In block 802, the traffic mitigation initiator 202 may determine a first controllable vehicle 103 and a second controllable vehicle 103 traveling along a mitigation road segment of a roadway. In some embodiments, the traffic mitigation initiator 202 may determine the first controllable vehicle 103 and the mitigation road segment in a manner similar to determining the first controllable vehicle 103 traveling along the mitigation road segment as discussed above with reference to FIG. 3. The mitigation initiator 202 may then determine other controllable vehicles 103 travelling along the mitigation road segment, and determine that the distance between the first controllable vehicle 103 and the other controllable vehicles 103 does not satisfy the proximity distance threshold (e.g., less than 5 m). Thus, the mitigation initiator 202 may determine that there is no proximate controllable vehicle 103 currently located proximate to the first controllable vehicle 103 in the mitigation road segment.

In some embodiments, to determine the second controllable vehicle 103, the mitigation initiator 202 may determine the candidate controllable vehicles 103 travelling along the mitigation road segment that have the distance between the candidate controllable vehicle 103 and the first controllable vehicle 103 satisfying an initial vehicle distance threshold (e.g., more than 5 m and less than 20 m), and randomly select the second controllable vehicle 103 from these candidate controllable vehicles 103. In some embodiments, the mitigation initiator 202 may select among these candidate controllable vehicles 103 the candidate controllable vehicle 103 that has the lowest distance between the candidate controllable vehicle 103 and the first controllable vehicle 103 to be the second controllable vehicle 103. In some embodiments, if the mitigation initiator 202 determines that the distance between the first controllable vehicle 103 and other controllable vehicles 103 travelling on the mitigation road segment does not satisfy the initial vehicle distance threshold, the mitigation initiator 202 may determine that these controllable vehicles 103 are located far away from one another. In that situation, the traffic mitigation application 120 may control the vehicle speed of these controllable vehicles 103 individually to mitigate the traffic congestion and the traffic oscillation on the roadway.

In block 804, the traffic mitigation initiator 202 may monitor the distance between the first controllable vehicle 103 and the second controllable vehicle 103. In block 806, the traffic mitigation initiator 202 may determine whether the distance between the first controllable vehicle 103 and the second controllable vehicle 103 satisfies the proximity distance threshold (e.g., less than 5 m) at the current timestamp $t = t_{current}$. If the distance between the first controllable vehicle 103 and the second controllable vehicle 103 does not satisfy the proximity distance threshold at the current timestamp, the method 800 proceeds to block 804 to continue monitoring the distance between the first controllable vehicle 103 and the second controllable vehicle 103. If the distance between the first controllable vehicle 103 and the second controllable vehicle 103 satisfies the proximity distance threshold at the current timestamp, the traffic mitigation initiator 202 may determine the second controllable vehicle 103 to be the proximate controllable vehicle 103 associated with the first controllable vehicle 103. The method 800 may then proceed to block 806 to start the mitigation process. In some embodiments, the traffic mitigation initiator 202 may determine multiple second controllable vehicles 103 and the traffic mitigation application 120 may start the mitigation process when the first controllable vehicle 103 and these second controllable vehicles 103 located proximate to one another.

In some embodiments, the traffic mitigation application 120 may perform the mitigation process with the first controllable vehicle 103 and the second controllable vehicle(s) 103 as the proximate controllable vehicle(s) 103. This mitigation process may be performed in a manner similar to the mitigation process discussed above with reference to FIGS. 3-7. For example, in block 808, the traffic mitigation initiator 202 may determine the control lane and the impedible lane(s) in the mitigation road segment. The control lane may include the first controllable vehicle 103 and may be impedible by the first controllable vehicle 103. The impedible lane(s) may include the second controllable vehicle(s) 103 and may be impedible by the second controllable vehicle(s) 103. In block 810, the traffic mitigation initiator 202 may determine one or more open lanes in the mitigation road segment. In an example, the one or more open lanes may be adjacent (e.g., directly adjacent or indirectly adjacent) to the control lane. In some embodiments, the one or more open lanes may exclude the first controllable vehicle 103 and the second controllable vehicle(s) 103, and thus the traffic flow flowing through the one or more open lanes may not be impeded.

In block 812, the traffic mitigation application 120 may apply the target mitigation speed to the first controllable vehicle 103 in the control lane and the second controllable vehicle(s) 103 in the impedible lane(s). As discussed elsewhere herein, the model generator 204, the traffic oscillation analyzer 206, and the target speed calculator 208 may determine the target mitigation speed for the first controllable vehicle 103 based on the traffic state of the one or more open lanes (e.g., the initiation traffic state B) and the target traffic state for the upstream portion of the mitigation road segment (e.g., the target traffic state A). If the mitigation road segment includes a single open lane, the target mitigation speed applied to the first controllable vehicle 103 in the control lane and the second controllable vehicle(s) 103 in the impedible lane(s) may adjust the traffic stream flowing through the only open lane of the mitigation road segment to mitigate the traffic congestion and smooth the traffic oscillation. If the mitigation road segment includes multiple open lanes, the target mitigation speed applied to the first controllable vehicle 103 in the control lane and the second controllable vehicle(s) 103 in the impedible lane(s) may adjust the traffic flow flowing through the multiple open lanes of the mitigation road segment to mitigate the traffic congestion and smooth the traffic oscillation.

Thus, as discussed above, the traffic mitigation application 120 may delay controlling the vehicle speed of the controllable vehicles 103 in the mitigation road segment until there are multiple controllable vehicle(s) 103 located proximate to one another to simultaneously impede multiple lanes in the mitigation road segment by these controllable vehicles 103. This implementation is particularly advantageous because it can expedite the mitigation of the traffic congestion and the traffic oscillation on the roadway. In particular, as multiple lanes in the mitigation road segment are simultaneously impeded by multiple controllable vehicles 103, the number of open lanes in the mitigation road segment may be limited, and thus the flow rate of the traffic flow flowing through these open lanes may be reduced. As discussed elsewhere herein, the flow rate of the traffic flow flowing through the open lanes may be indicated by the second traffic diagram 914 in FIG. 9A. As the flow rate of the traffic flow flowing through the open lanes is reduced, the slope of the state transition line AB may increase and thus, the target mitigation speed $v^*_0$ may also increase. As a result, the first controllable vehicle 103 and the second controllable vehicle(s) 103 to which the target mitigation speed $v^*_0$ is applied may proceed forward with higher vehicle speed during the mitigation process, thereby reducing the amount of time needed to mitigate the traffic congestion and the traffic oscillation.

In the above description, for purposes of explanation, numerous specific details are set forth in order to provide a thorough understanding of the present disclosure. However, it should be understood that the technology described herein could be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A method comprising:
   determining a first controllable vehicle traveling along a mitigation road segment of a roadway;
   determining a control lane in the mitigation road segment, the control lane including the first controllable vehicle and being impedible by the first controllable vehicle;
   determining a first open lane in the mitigation road segment, the first open lane being adjacent to the control lane in the mitigation road segment; and
   autonomously controlling the first controllable vehicle including sending an electronic signal to autonomously controllable hardware causing the autonomously controllable hardware to apply a target mitigation speed to the first controllable vehicle in the control lane, the target mitigation speed being based on a traffic state of the first open lane, the target mitigation speed adjusting a traffic stream that flows through the first open lane to mitigate traffic congestion located downstream of the mitigation road segment.

2. The method of claim 1, wherein the target mitigation speed increases a passing flow rate at which the traffic stream flowing through the first open lane passes the first controllable vehicle travelling at the target mitigation speed in the control lane.

3. The method of claim 1, further comprising:
   determining a second open lane in the mitigation road segment; and wherein
   the target mitigation speed maximizes an overall passing flow rate at which the traffic stream flowing through the first open lane and a traffic stream flowing through the second open lane pass the first controllable vehicle travelling at the target mitigation speed in the control lane.

4. The method of claim 1, wherein determining the first open lane in the mitigation road segment includes:
   determining one or more proximate controllable vehicles located proximate to the first controllable vehicle in the mitigation road segment; and
   determining the first open lane in the mitigation road segment, the first open lane excluding the one or more proximate controllable vehicles and being unimpedible by the one or more proximate controllable vehicles.

5. The method of claim 1, further comprising:
   determining a proximate controllable vehicle located proximate to the first controllable vehicle in the mitigation road segment;
   determining an impedible lane in the mitigation road segment, the impedible lane including the proximate controllable vehicle and being impedible by the proximate controllable vehicle; and
   applying the target mitigation speed to the proximate controllable vehicle in the impedible lane.

6. The method of claim 1, further comprising:
   determining one or more open lanes and one or more impedible lanes in the mitigation road segment, the one or more open lanes including the first open lane;
   generating a first traffic diagram associated with the roadway in an unimpeded traffic condition, the control lane and the one or more impedible lanes in the mitigation road segment being unimpeded in the unimpeded traffic condition;
   generating a second traffic diagram associated with the one or more open lanes in an impeded traffic condition, the control lane and the one or more impedible lanes in the mitigation road segment being impeded in the impeded traffic condition;
   determining a target traffic state for an upstream portion of the mitigation road segment, the upstream portion of the mitigation road segment being located upstream of the first controllable vehicle; and
   determining the target mitigation speed for the first controllable vehicle based on the first traffic diagram associated with the roadway in the unimpeded traffic condition, the second traffic diagram associated with the one or more open lanes in the impeded traffic condition, and the target traffic state for the upstream portion of the mitigation road segment.

7. The method of claim 6, wherein generating the first traffic diagram associated with the roadway in the unimpeded traffic condition includes:
   monitoring traffic data of the roadway;
   computing one or more traffic metrics associated with the roadway based on the traffic data of the roadway;
   determining one or more roadway properties of the roadway;
   generating the first traffic diagram associated with the roadway in the unimpeded traffic condition based on an initial traffic diagram, the one or more traffic metrics associated with the roadway, and the one or more roadway properties of the roadway; and wherein
   the first traffic diagram indicates a relationship between a flow rate and a vehicle density on the roadway or a relationship between a vehicle speed and the vehicle density on the roadway in the unimpeded traffic condition.

8. The method of claim 7, wherein
   the traffic data of the roadway includes one or more of a flow rate, a vehicle density, and a vehicle speed associated with a plurality of road segments of the roadway at a plurality of timestamps;
   the one or more traffic metrics associated with the roadway includes one or more of a roadway capacity, a capacity vehicle density corresponding to the roadway capacity, and a jam vehicle density associated with the roadway; and
   the one or more roadway properties of the roadway includes one or more of a speed limit and a number of lanes associated with the roadway.

9. The method of claim 6, wherein generating the second traffic diagram associated with the one or more open lanes in the impeded traffic condition includes:
   monitoring traffic data of the roadway;
   computing one or more traffic metrics associated with the roadway based on the traffic data of the roadway;
   computing one or more traffic metrics associated with the one or more open lanes based on the traffic metrics associated with the roadway and a number of open lanes in the mitigation road segment;
   determining one or more roadway properties of the one or more open lanes;
   generating the second traffic diagram associated with the one or more open lanes in the impeded traffic condition based on an initial traffic diagram, the one or more traffic metrics associated with the one or more open lanes, and the one or more roadway properties of the one or more open lanes; and wherein
   the second traffic diagram indicates a relationship between a flow rate and a vehicle density in the one or more open lanes or a relationship between a vehicle speed and the vehicle density in the one or more open lanes in the impeded traffic condition.

10. The method of claim 6, wherein determining the target traffic state for the upstream portion of the mitigation road segment includes:
  determining a traffic wave on the roadway and one or more propagation parameters of the traffic wave;
  determining a vehicle density of the mitigation road segment at a current timestamp;
  estimating an average vehicle density of the mitigation road segment at a future timestamp based on the vehicle density of the mitigation road segment at the current timestamp and the one or more propagation parameters of the traffic wave; and
  determining the target traffic state for the upstream portion of the mitigation road segment based on the average vehicle density of the mitigation road segment at the future timestamp.

11. The method of claim 10, wherein determining the traffic wave on the roadway and the one or more propagation parameters of the traffic wave includes:
  receiving vehicle movement data of one or more vehicles located on the roadway at a plurality of timestamps;
  determining a plurality of vehicle density distributions associated with the roadway at the plurality of timestamps based on the vehicle movement data of the one or more vehicles located on the roadway at the plurality of timestamps and the first traffic diagram associated with the roadway in the unimpeded traffic condition; and
  determining the traffic wave on the roadway and the one or more propagation parameters of the traffic wave based on the plurality of vehicle density distributions associated with the roadway at the plurality of timestamps.

12. The method of claim 11, wherein
  the vehicle movement data of the one or more vehicles located on the roadway at the plurality of timestamps includes one or more of a vehicle location, a vehicle speed, and a vehicle lane of a vehicle among the one or more vehicles at a corresponding timestamp among the plurality of timestamps; and
  the one or more propagation parameters of the traffic wave includes one or more of a propagation speed, a propagation distance, a coverage area of a traffic stop region associated with the traffic wave, and a coverage area of a traffic moving region associated with the traffic wave.

13. The method of claim 10, wherein determining the vehicle density of the mitigation road segment at the current timestamp includes:
  receiving vehicle movement data of a vehicle, the vehicle movement data including a vehicle speed of the vehicle at a vehicle location in the mitigation road segment at the current timestamp; and
  determining the vehicle density of the mitigation road segment at the current timestamp based on the vehicle speed of the vehicle at the current timestamp and the first traffic diagram associated with the roadway in the unimpeded traffic condition.

14. The method of claim 6, wherein determining the target traffic state for the upstream portion of the mitigation road segment includes:
  determining the target traffic state on the first traffic diagram associated with the roadway in the unimpeded traffic condition based on an average vehicle density of the mitigation road segment at a future timestamp, and wherein
  the target mitigation speed transitions the upstream portion of the mitigation road segment to the target traffic state having the average vehicle density of the mitigation road segment at the future timestamp.

15. The method of claim 6, wherein determining the target mitigation speed for the first controllable vehicle includes:
  determining a tangent line including the target traffic state on the first traffic diagram associated with the roadway in the unimpeded traffic condition and being tangent to the second traffic diagram associated with the one or more open lanes in the impeded traffic condition;
  determining an initiation traffic state of the one or more open lanes on the second traffic diagram associated with the one or more open lanes in the impeded traffic condition based on the tangent line, the traffic state of the first open lane being the initiation traffic state of the one or more open lanes; and
  determining the target mitigation speed for the first controllable vehicle based on a slope of a state transition line, the state transition line including the initiation traffic state on the second traffic diagram associated with the one or more open lanes in the impeded traffic condition and the target traffic state on the first traffic diagram associated with the roadway in the unimpeded traffic condition.

16. The method of claim 1, wherein determining the first controllable vehicle traveling along the mitigation road segment of the roadway is based on wireless communication with one or more vehicles traveling on the roadway and a determination, based on the wireless communication, that the first controllable vehicle includes autonomously controllable hardware for automatically controlling operations of the first controllable vehicle.

17. A system comprising:
  one or more processors; and
  one or more memories storing instructions that, when executed by the one or more processors, cause the system to:
    determine a first controllable vehicle traveling along a mitigation road segment of a roadway;
    determine a control lane in the mitigation road segment, the control lane including the first controllable vehicle and being impedible by the first controllable vehicle;
    determine a first open lane in the mitigation road segment, the first open lane being adjacent to the control lane in the mitigation road segment; and
    autonomously control the first controllable vehicle including sending an electronic signal to autonomously controllable hardware causing the autonomously controllable hardware to apply a target mitigation speed to the first controllable vehicle in the control lane, the target mitigation speed being based on a traffic state of the first open lane, the target mitigation speed adjusting a traffic stream that flows through the first open lane to mitigate traffic congestion located downstream of the mitigation road segment.

18. The system of claim 17, wherein the target mitigation speed increases a passing flow rate at which the traffic stream flowing through the first open lane passes the first controllable vehicle travelling at the target mitigation speed in the control lane.

19. The system of claim 17, wherein the instructions, when executed by the one or more processors, further cause the system to:
  determine a second open lane in the mitigation road segment; and wherein the target mitigation speed maximizes an overall passing flow rate at which the traffic stream flowing through the first open lane and a traffic stream flowing through the second open lane pass the first controllable vehicle travelling at the target mitigation speed in the control lane.

20. The system of claim 17, wherein to determine the first open lane in the mitigation road segment includes:
determining one or more proximate controllable vehicles located proximate to the first controllable vehicle in the mitigation road segment; and
determining the first open lane in the mitigation road segment, the first open lane excluding the one or more proximate controllable vehicles and being unimpedible by the one or more proximate controllable vehicles.

21. The system of claim 17, wherein the instructions, when executed by the one or more processors, further cause the system to:
determine a proximate controllable vehicle located proximate to the first controllable vehicle in the mitigation road segment;
determine an impedible lane in the mitigation road segment, the impedible lane including the proximate controllable vehicle and being impedible by the proximate controllable vehicle; and
apply the target mitigation speed to the proximate controllable vehicle in the impedible lane.

22. The system of claim 17, wherein the instructions, when executed by the one or more processors, further cause the system to:
determine one or more open lanes and one or more impedible lanes in the mitigation road segment, the one or more open lanes including the first open lane;
generate a first traffic diagram associated with the roadway in an unimpeded traffic condition, the control lane and the one or more impedible lanes in the mitigation road segment being unimpeded in the unimpeded traffic condition;
generate a second traffic diagram associated with the one or more open lanes in an impeded traffic condition, the control lane and the one or more impedible lanes in the mitigation road segment being impeded in the impeded traffic condition;
determine a target traffic state for an upstream portion of the mitigation road segment, the upstream portion of the mitigation road segment being located upstream of the first controllable vehicle; and
determine the target mitigation speed for the first controllable vehicle based on the first traffic diagram associated with the roadway in the unimpeded traffic condition, the second traffic diagram associated with the one or more open lanes in the impeded traffic condition, and the target traffic state for the upstream portion of the mitigation road segment.

23. The system of claim 22, wherein to generate the first traffic diagram associated with the roadway in the unimpeded traffic condition includes:
monitoring traffic data of the roadway;
computing one or more traffic metrics associated with the roadway based on the traffic data of the roadway;
determining one or more roadway properties of the roadway;
generating the first traffic diagram associated with the roadway in the unimpeded traffic condition based on an initial traffic diagram, the one or more traffic metrics associated with the roadway, and the one or more roadway properties of the roadway; and wherein
the first traffic diagram indicates a relationship between a flow rate and a vehicle density on the roadway or a relationship between a vehicle speed and the vehicle density on the roadway in the unimpeded traffic condition.

24. The system of claim 23, wherein
the traffic data of the roadway includes one or more of a flow rate, a vehicle density, and a vehicle speed associated with a plurality of road segments of the roadway at a plurality of timestamps;
the one or more traffic metrics associated with the roadway includes one or more of a roadway capacity, a capacity vehicle density corresponding to the roadway capacity, and a jam vehicle density associated with the roadway; and
the one or more roadway properties of the roadway includes one or more of a speed limit and a number of lanes associated with the roadway.

25. The system of claim 22, wherein to generate the second traffic diagram associated with the one or more open lanes in the impeded traffic condition includes:
monitoring traffic data of the roadway;
computing one or more traffic metrics associated with the roadway based on the traffic data of the roadway;
computing one or more traffic metrics associated with the one or more open lanes based on the traffic metrics associated with the roadway and a number of open lanes in the mitigation road segment;
determining one or more roadway properties of the one or more open lanes;
generating the second traffic diagram associated with the one or more open lanes in the impeded traffic condition based on an initial traffic diagram, the one or more traffic metrics associated with the one or more open lanes, and the one or more roadway properties of the one or more open lanes; and wherein
the second traffic diagram indicates a relationship between a flow rate and a vehicle density in the one or more open lanes or a relationship between a vehicle speed and the vehicle density in the one or more open lanes in the impeded traffic condition.

26. The system of claim 22, wherein to determine the target traffic state for the upstream portion of the mitigation road segment includes:
determining a traffic wave on the roadway and one or more propagation parameters of the traffic wave;
determining a vehicle density of the mitigation road segment at a current timestamp;
estimating an average vehicle density of the mitigation road segment at a future timestamp based on the vehicle density of the mitigation road segment at the current timestamp and the one or more propagation parameters of the traffic wave; and
determining the target traffic state for the upstream portion of the mitigation road segment based on the average vehicle density of the mitigation road segment at the future timestamp.

27. The system of claim 26, wherein to determine the traffic wave on the roadway and the one or more propagation parameters of the traffic wave includes:
receiving vehicle movement data of one or more vehicles located on the roadway at a plurality of timestamps;
determining a plurality of vehicle density distributions associated with the roadway at the plurality of timestamps based on the vehicle movement data of the one or more vehicles located on the roadway at the plurality of timestamps and the first traffic diagram associated with the roadway in the unimpeded traffic condition; and determining the traffic wave on the roadway and the one or more propagation parameters of the traffic wave based on the plurality of vehicle density distributions associated with the roadway at the plurality of timestamps.

28. The system of claim 27, wherein the vehicle movement data of the one or more vehicles located on the roadway at the plurality of timestamps includes one or more of a vehicle location, a vehicle speed, and a vehicle lane of a vehicle among the one or more vehicles at a corresponding timestamp among the plurality of timestamps; and the one or more propagation parameters of the traffic wave includes one or more of a propagation speed, a propagation distance, a coverage area of a traffic stop region associated with the traffic wave, and a coverage area of a traffic moving region associated with the traffic wave.

29. The system of claim 26, wherein to determine the vehicle density of the mitigation road segment at the current timestamp includes:

receiving vehicle movement data of a vehicle, the vehicle movement data including a vehicle speed of the vehicle at a vehicle location in the mitigation road segment at the current timestamp; and determining the vehicle density of the mitigation road segment at the current timestamp based on the vehicle speed of the vehicle at the current timestamp and the first traffic diagram associated with the roadway in the unimpeded traffic condition.

30. The system of claim 22, wherein to determine the target traffic state for the upstream portion of the mitigation road segment includes:

determining the target traffic state on the first traffic diagram associated with the roadway in the unimpeded traffic condition based on an average vehicle density of the mitigation road segment at a future timestamp, and wherein the target mitigation speed transitions the upstream portion of the mitigation road segment to the target traffic state having the average vehicle density of the mitigation road segment at the future timestamp.

31. The system of claim 22, wherein to determine the target mitigation speed for the first controllable vehicle includes:

determining a tangent line including the target traffic state on the first traffic diagram associated with the roadway in the unimpeded traffic condition and being tangent to the second traffic diagram associated with the one or more open lanes in the impeded traffic condition;

determining an initiation traffic state of the one or more open lanes on the second traffic diagram associated with the one or more open lanes in the impeded traffic condition based on the tangent line, the traffic state of the first open lane being the initiation traffic state of the one or more open lanes; and determining the target mitigation speed for the first controllable vehicle based on a slope of a state transition line, the state transition line including the initiation traffic state on the second traffic diagram associated with the one or more open lanes in the impeded traffic condition and the target traffic state on the first traffic diagram associated with the roadway in the unimpeded traffic condition.

* * * * *